US009580575B2

(12) United States Patent
Dotson et al.

(10) Patent No.: US 9,580,575 B2
(45) Date of Patent: Feb. 28, 2017

(54) POLYETHYLENE ARTICLES

(71) Applicant: MILLIKEN & COMPANY, Spartanburg, SC (US)

(72) Inventors: Darin L. Dotson, Moore, SC (US); Chi-Chun Tsai, Boiling Springs, SC (US); Haihu Qin, Greer, SC (US); John W. Miley, Campobello, SC (US); Mary Angela Cooley, Cowpens, SC (US); Sanjeev K. Dey, Spartanburg, SC (US); Eduardo Torres, Boiling Springs, SC (US); Francisco Alvarez, Boiling Springs, SC (US)

(73) Assignee: Milliken & Company, Spartanburg, SC (US)

( * ) Notice: Subject to any disclaimer, the term of this patent is extended or adjusted under 35 U.S.C. 154(b) by 362 days.

(21) Appl. No.: 14/492,585

(22) Filed: Sep. 22, 2014

(65) Prior Publication Data

US 2015/0086736 A1    Mar. 26, 2015

Related U.S. Application Data

(60) Provisional application No. 61/881,251, filed on Sep. 23, 2013.

(51) Int. Cl.
*A61F 2/06*  (2013.01)
*C08K 5/20*  (2006.01)
*C08J 5/00*  (2006.01)
*C08J 5/18*  (2006.01)
*C08L 23/06*  (2006.01)
*C08K 5/00*  (2006.01)

(52) U.S. Cl.
CPC .. *C08K 5/20* (2013.01); *C08J 5/00* (2013.01); *C08J 5/18* (2013.01); *C08L 23/06* (2013.01); *C08J 2323/06* (2013.01); *C08K 5/0083* (2013.01); *Y10T 428/139* (2015.01)

(58) Field of Classification Search
CPC .......... C08K 5/20; Y10T 428/139; C08J 5/00; C08J 5/18; C08J 2323/06; C08L 23/06
USPC .............................. 428/35.6, 35.7, 34.7, 35.1
See application file for complete search history.

(56) References Cited

U.S. PATENT DOCUMENTS

| 2,159,605 | A | 5/1939 | Schumacher et al. |
| 3,207,735 | A | 9/1965 | Wijga |
| 3,207,736 | A | 9/1965 | Wijga |
| 3,207,737 | A | 9/1965 | Wales |
| 3,207,738 | A | 9/1965 | Wijga |
| 3,207,739 | A | 9/1965 | Wales |
| 3,458,604 | A | 7/1969 | Palmer |
| 4,380,621 | A | 4/1983 | Nield et al. |
| 6,096,811 | A | 8/2000 | Amos et al. |
| 6,235,823 | B1 | 5/2001 | Ikeda et al. |
| 6,245,844 | B1 | 6/2001 | Kurian et al. |
| 6,787,067 | B2 | 9/2004 | Yukino et al. |
| 7,115,750 | B1 | 10/2006 | Kato et al. |
| 7,569,630 | B2 | 8/2009 | Ma et al. |
| 7,682,689 | B2 | 3/2010 | Sadamitsu et al. |
| 7,696,380 | B2 | 4/2010 | Kitagawa et al. |
| 7,723,413 | B2 | 5/2010 | Ishikawa et al. |
| 7,786,203 | B2 | 8/2010 | Hanssen et al. |
| 2007/0134296 | A1 | 6/2007 | Burgermeister et al. |

FOREIGN PATENT DOCUMENTS

| CN | 103214736 A | 7/2013 |
| DE | 2434953 A1 | 2/1975 |
| EP | 0 557 721 A2 | 9/1993 |
| EP | 1 266 932 A1 | 12/2002 |
| EP | 1 972 703 A1 | 9/2008 |
| EP | 2 392 458 A2 | 12/2011 |
| GB | 903015 A | 8/1962 |
| GB | 955304 A | 4/1964 |
| GB | 992470 A | 5/1965 |
| GB | 1001709 A | 8/1965 |
| JP | 6-155925 A | 6/1994 |
| JP | 10-25267 A | 1/1998 |
| JP | 2001-279191 A | 10/2001 |
| WO | WO 00/17265 A1 | 3/2000 |
| WO | WO 2010/144784 A1 | 12/2010 |
| WO | WO 2011/047108 A1 | 4/2011 |

OTHER PUBLICATIONS

Beck, H.N., "Heterogeneous Nucleating Agents for Polypropylene Crystallization", *Journal of Applied Polymer Science*, vol. 11 pp. 673-685, (1967).
Whittmann et al., "Epitaxial crystallization of monoclinic and orthorhombic polyethylene phases", *Polymer*, vol. 30 pp. 27-34, (1989), Butterworth & Co. (Publishers) Ltd.
Chemical Abstracts Service Database Accession No. 2013:1161532, Abstract of CN 103214736 A, "Amide based nucleating agent for preparation of isotactic polypropylene with beta crystal form, its preparation method and application," Guangzhou Chemistry Co., Ltd., Jul. 24, 2013.
Chemical Abstracts Service Database Accession No. 2005:104840, Abstract of Qiao et al., "Synthesis of a novel nucleating agent with thermotropic crystalline liquid behavior and its influence on the crystallization of polyethylene—(I). Synthesis and characterization of a novel nucleating agent with thermotropic liquid crystalline behavior," *Gaofenzi Cailiao Kexue Yu Gongcheng*, 2004, 20(6), 94-97.
SciFinder Search Reference Answer Set, Search for metal salts of terephthalic acid alkyl esters, Feb. 25, 2013.

(Continued)

*Primary Examiner* — Ellen S Wood
(74) *Attorney, Agent, or Firm* — Robert M. Lanning

(57) ABSTRACT

A polyethylene article comprises crystalline polyethylene in an orthorhombic unit cell. The b-axes of the crystalline polyethylene are substantially aligned with the machine direction of the article. In particular, the Herman's index of the b-axes in the machine direction is greater than zero and greater than the Herman's indices of the b-axes in both the transverse and normal directions. The unique physical attributes exhibited by a polyethylene article having this new morphology are also described.

34 Claims, No Drawings

(56) References Cited

OTHER PUBLICATIONS

Chemical Abstracts Service Database Accession No. 2013:230959, Abstract of IN 2011 MU 02218 A, "Stable formulation for calcium benzamidosalicylate," Genesen Labs Ltd., Feb. 8, 2013.
Chemical Abstracts Service Database Accession No. 1998:68515, Abstract of JP 10-25267 A, "Preparation of carboxylic acid polyvalent metal salts a developers for heat and pressure-sensitive recording materials," Mitsui Toatsu Chemicals, Inc., Jan. 27, 1998.
Chemical Abstracts Service Database Accession No. 1995:362238, Abstract of JP 6-155925 A, "Heat-sensitive recording material with improved color image storage stability," Mitsui Toatsu Chemicals, Jun. 3, 1994.
Chemical Abstracts Service Database Accession No. 1970:15789, Abstract of Koval'chuk, T.V., "UV-absorption spectra and determination of the calcium salt of p-benzamidosalicylic acid (bepascum)," *Farmatsevtichnii Zhurnal*, 1969, 24(5), 62-6.
Chemical Abstracts Service CAS Registry No. 16777-78-9, Substance Detail and References, Mar. 13, 2015.
Chemical Abstracts Service CAS Registry No. 23745-26-8, Substance Detail and References, Mar. 13, 2015.
Chemical Abstracts Service CAS Registry No. 54056-74-5, Substance Detail and References, Mar. 13, 2015.
Chemical Abstracts Service CAS Registry No. 925413-00-9, Substance Detail and References, Mar. 13, 2015.
Chemical Abstracts Service CAS Registry No. 1154322-83-4, Substance Detail, Mar. 13, 2015.
Chemical Abstracts Service CAS Registry No. 1250130-73-4, Substance Detail, Mar. 13, 2015.
Chemical Abstracts Service CAS Registry No. 1395043-43-2, Substance Detail, Mar. 13, 2015.
PCT/US2014/056932 International Search Report, International Filing Date Sep. 23, 2014, 5 pages.
PCT/US2014/056932 Written Opinion of the International Searching Authority, International Filing Date Sep. 23, 2014, 8 pages.

POLYETHYLENE ARTICLES

CROSS REFERENCE TO RELATED APPLICATIONS

This application claims, pursuant to 35 U.S.C. §119(e)(1), priority to and the benefit of the filing date of U.S. Patent Application No. 61/881,251 filed on Sep. 23, 2013, which application is hereby incorporated by reference in its entirety.

TECHNICAL FIELD OF THE INVENTION

This application relates to nucleating agents for thermoplastic polymers, polymer compositions comprising such nucleating agents, articles made from such polymer compositions, and methods for making and molding such polymer compositions.

BACKGROUND

Polyethylene polymers are, under normal conditions, semicrystalline polymers containing crystalline regions interspersed with amorphous regions. In particular, polyethylene polymers crystallize by folding of the polyethylene chain, which produces crystalline lamellae interspersed with an amorphous polyethylene phase. When polyethylene polymers are processed under conditions that subject the molten polymer to relatively little strain, the polymer chains in the polymer melt are relaxed in a random coil configuration. In the absence of heterogeneous nuclei (impurities or intentionally added agents), the polymer melt (e.g., polyethylene melt) cools until sufficient inter-chain interaction occurs to spontaneously initiate chain-folding and subsequent crystalline lamellar growth. This lamellar growth is typically spherulitic and exhibits very little, if any, preferred orientation of the polyethylene's crystallographic a, b, and c axes in three dimensions.

In extensional strain processes like blown film, however, and depending on the exact strain level, a greater or lesser degree of the melt chains may be extended in the flow direction. Alignment and attraction of some of these extended chains can lead to crystallization of fibrils which form at higher temperatures than the bulk of primary crystallization and are oriented in the flow direction. These fibrils can be very effective sites for further nucleation, with the subsequent direction of fastest growth (b axis of the polyethylene orthorhombic unit cell) normal to the fibril length. The b axis (or lamellar fast growth direction) is distributed more or less radially around these fibrils (and therefore the b-axis is normal to the flow direction). This morphology is referred to as a row nucleated, or "shish-kebab" morphology, with the fibrils forming the "shishes" and the chain-folded lamellae forming the "kebabs" growing normal to the "shishes." The degree of extensional strain and the potential degree of relaxation of the melt determine the exact final morphology. At intermediate strain and/or with moderate relaxation possible, i.e. with moderate trapped flow direction orientation approaching the crystallization temperature, fibril nucleation density is moderate. Based on widely accepted literature models, Keller/Machin 1 (KM 1) morphology results, wherein the b axis is primarily normal to the fibrils and distributed radially around fibrils (and therefore the b-axis is normal to the flow direction), and the a axis shows at least some net level of orientation parallel to fibril or flow direction. Under more extreme combinations of extensional strain and lack of melt relaxation, fibril nucleation density is relatively higher. Keller/Machin 2 (KM 2) morphology results, wherein b axis orientation shows strong net orientation normal to fibril length and distributed radially around the fibril (and therefore the b-axis is normal to the flow direction). Lamellar twisting is not possible due to very high fibril nucleation density, and the c axis shows a significant net orientation parallel to fibril or flow direction.

The KM1 and KM2 morphologies can lead to certain undesirable properties in an article. For example, polyethylene films exhibiting either the KM1 or KM2 morphology exhibit unbalanced tear strength between the machine direction and the transverse direction. While this lack of balance may not be problematic for certain articles and applications, it can prove troublesome for tearable films. Tearable films that exhibit a lack of balance in tear strength can have a tear that suddenly changes the direction in which it propagates through the film. This can be particularly problematic for tearable films used in food packaging, where a controlled tear is desired in order to avoid spilling the contents of the packaging.

While the addition of nucleating agents can change certain aspects of the crystallization, their addition has not yet been observed to produce polyethylene in which the b axis of the orthorhombic polyethylene unit cell is preferentially parallel to the machine direction of the polyethylene article. Applicants believe that such a morphology is desirable and will enable one to produce polyethylene articles having unique physical properties, such as more balanced tear strength in the machine and transverse directions, higher machine direction stiffness, better barrier, and higher heat distortion temperature (HDT) as well as other beneficial properties.

BRIEF SUMMARY OF THE INVENTION

The present application generally relates to articles made from a polyethylene polymer. The crystalline polyethylene in the article exhibits a unique orientation within the article, and this unique orientation is believed to impart highly desirable properties to the article. For example, when the article is in the form of a film, the unique orientation of the crystalline polyethylene imparts balanced tear strength (tear resistance) to the film.

In a first embodiment, the invention provides a polyethylene article produced from a molten polyethylene polymer, the article having a thickness, the article having at least one local machine direction ($MD_{local}$) corresponding to a direction in which the molten polyethylene polymer flowed within a region in the article when the article was produced, the article having a corresponding local transverse direction ($TD_{local}$) perpendicular to each local machine direction within the article, the article having a local normal direction ($ND_{local}$) perpendicular to each local machine direction and corresponding local transverse direction and parallel to a line passing through the thickness of the article, the polyethylene polymer comprising a plurality of lamellae, each lamella comprising crystalline polyethylene, the crystalline polyethylene having a b-axis, the b-axes of the crystalline polyethylene in the lamellae having a Herman's orientation index at each local machine direction ($F(MD_{local},020)$), a Herman's orientation index at each corresponding local transverse direction ($F(TD_{local},020)$), and a Herman's orientation index at each local normal direction ($F(ND_{local},020)$), the b-axes of the crystalline polyethylene in the lamella being oriented within the article such that $F(MD_{local},020)>0$, $F(MD_{local},020)>F(TD_{local},020)$, and $F(MD_{local},020)>F(ND_{local},020)$.

In a second embodiment, the invention provides a polyethylene article produced by extruding a molten polyethylene polymer through an orifice in a direction, the article having a thickness, the article having a machine direction (MD) corresponding to the direction in which the molten polyethylene polymer exited the orifice, the article having a transverse direction (TD) perpendicular to the machine direction and perpendicular to a line passing through the thickness of the article, the article having a normal direction (ND) perpendicular to the machine direction and the transverse direction and parallel to a line passing through the thickness of the article, the polyethylene polymer comprising a plurality of lamellae, each lamella comprising crystalline polyethylene, the crystalline polyethylene having a b-axis, the b-axes of the crystalline polyethylene in the lamellae having a Herman's orientation index in the machine direction (F(MD,020)), a Herman's orientation index in the transverse direction (F(TD,020)), and a Herman's orientation index in the normal direction (F(ND, 020)), the b-axes of the crystalline polyethylene in the lamella being oriented within the article such that F(MD, 020)>0, F(MD,020)>F(TD,020), and F(MD,020)>F(ND, 020).

DETAILED DESCRIPTION OF THE INVENTION

The following definitions are provided to define several of the terms used throughout this application.

As used herein, the term "substituted alkyl groups" refers to univalent functional groups derived from substituted alkanes by removal of a hydrogen atom from a carbon atom of the alkane. In this definition, the term "substituted alkanes" refers to compounds derived from acyclic unbranched and branched hydrocarbons in which (1) one or more of the hydrogen atoms of the hydrocarbon is replaced with a non-hydrogen atom (e.g., a halogen atom) or a non-alkyl functional group (e.g., a hydroxy group, aryl group, or heteroaryl group) and/or (2) the carbon-carbon chain of the hydrocarbon is interrupted by an oxygen atom (as in an ether), a nitrogen atom (as in an amine), or a sulfur atom (as in a sulfide).

As used herein, the term "substituted cycloalkyl groups" refers to univalent functional groups derived from substituted cycloalkanes by removal of a hydrogen atom from a carbon atom of the cycloalkane. In this definition, the term "substituted cycloalkanes" refers to compounds derived from saturated monocyclic and polycyclic hydrocarbons (with or without side chains) in which (1) one or more of the hydrogen atoms of the hydrocarbon is replaced with a non-hydrogen atom (e.g., a halogen atom) or a non-alkyl functional group (e.g., a hydroxy group, aryl group, or heteroaryl group) and/or (2) the carbon-carbon chain of the hydrocarbon is interrupted by an oxygen atom, a nitrogen atom, or a sulfur atom.

As used herein, the term "substituted alkoxy groups" refers to univalent functional groups derived from substituted hydroxyalkanes by removal of a hydrogen atom from a hydroxy group. In this definition, the term "substituted hydroxyalkanes" refer to compounds having one or more hydroxy groups bonded to a substituted alkane, and the term "substituted alkane" is defined as it is above in the definition of substituted alkyl groups.

As used herein, the term "substituted aryl groups" refers to univalent functional groups derived from substituted arenes by removal of a hydrogen atom from a ring carbon atom. In this definition, the term "substituted arenes" refers to compounds derived from monocyclic and polycyclic aromatic hydrocarbons in which one or more of the hydrogen atoms of the hydrocarbon is replaced with a non-hydrogen atom (e.g., a halogen atom) or a non-alkyl functional group (e.g., a hydroxy group).

As used herein, the term "substituted heteroaryl groups" refers to univalent functional groups derived from substituted heteroarenes by removal of a hydrogen atom from a ring atom. In this definition, the term "substituted heteroarenes" refers to compounds derived from monocyclic and polycyclic aromatic hydrocarbons in which (1) one or more of the hydrogen atoms of the hydrocarbon is replaced with a non-hydrogen atom (e.g., a halogen atom) or a non-alkyl functional group (e.g., a hydroxy group) and (2) at least one methine group (—C═) of the hydrocarbon is replaced by a trivalent heteroatom and/or at least one vinylidene group (—CH═CH—) of the hydrocarbon is replaced by a divalent heteroatom.

As used herein, the term "alkanediyl groups" refers to divalent functional groups derived from alkanes by removal of two hydrogen atoms from the alkane. These hydrogen atoms can be removed from the same carbon atom on the alkane (as in ethane-1,1-diyl) or from different carbon atoms (as in ethane-1,2-diyl).

As used herein, the term "substituted alkanediyl groups" refers to divalent functional groups derived from substituted alkanes by removal of two hydrogen atoms from the alkane. These hydrogen atoms can be removed from the same carbon atom on the substituted alkane (as in 2-fluoroethane-1,1-diyl) or from different carbon atoms (as in 1-fluoroethane-1,2-diyl). In this definition, the term "substituted alkanes" has the same meaning as set forth above in the definition of substituted alkyl groups.

As used herein, the term "cycloalkanediyl groups" refers to divalent functional groups derived from cycloalkanes by removal of two hydrogen atoms from the cycloalkane. These hydrogen atoms can be removed from the same carbon atom on the cycloalkane or from different carbon atoms.

As used herein, the term "substituted cycloalkanediyl groups" refers to divalent functional groups derived from substituted cycloalkanes by removal of two hydrogen atoms from the alkane. In this definition, the term "substituted cycloalkanes" has the same meaning as set forth above in the definition of substituted cycloalkyl groups.

As used herein, the term "arenediyl groups" refers to divalent functional groups derived from arenes (monocyclic and polycyclic aromatic hydrocarbons) by removal of two hydrogen atoms from ring carbon atoms.

As used herein, the term "substituted arenediyl groups" refers to divalent functional groups derived from substituted arenes by removal of two hydrogen atoms from ring carbon atoms. In this definition, the term "substituted arenes" refers to compounds derived from monocyclic and polycyclic aromatic hydrocarbons in which one or more of the hydrogen atoms of the hydrocarbon is replaced with a non-hydrogen atom (e.g., a halogen atom) or a non-alkyl functional group (e.g., a hydroxy group).

As used herein, the term "heteroarenediyl groups" refers to divalent functional groups derived from heteroarenes by removal of two hydrogen atoms from ring atoms. In this definition, the term "heteroarenes" refers to compounds derived from monocyclic and polycyclic aromatic hydrocarbons in which at least one methine group (—C═) of the hydrocarbon is replaced by a trivalent heteroatom and/or at least one vinylidene group (—CH═CH—) of the hydrocarbon is replaced by a divalent heteroatom.

As used herein, the term "substituted heteroarenediyl groups" refers to divalent functional groups derived from substituted heteroarenes by removal of two hydrogen atoms from ring atoms. In this definition, the term "substituted heteroarenes" has the same meaning as set forth above in the definition of substituted heteroaryl groups.

As used herein, the term "alkanetriyl groups" refers to trivalent functional groups derived from alkanes by removal of three hydrogen atoms from the alkane. These hydrogen atoms can be removed from the same carbon atom on the alkane or from different carbon atoms.

As used herein, the term "substituted alkanetriyl groups" refers to trivalent functional groups derived from substituted alkanes by removal of three hydrogen atoms from the alkane. These hydrogen atoms can be removed from the same carbon atom on the substituted alkane or from different carbon atoms. In this definition, the term "substituted alkanes" has the same meaning as set forth above in the definition of substituted alkyl groups.

As used herein, the term "cycloalkanetriyl groups" refers to trivalent functional groups derived from cycloalkanes by removal of three hydrogen atoms from the cycloalkane.

As used herein, the term "substituted cycloalkanetriyl groups" refers to trivalent functional groups derived from substituted cycloalkanes by removal of three hydrogen atoms from the alkane. In this definition, the term "substituted cycloalkanes" has the same meaning as set forth above in the definition of substituted cycloalkyl groups.

As used herein, the term "arenetriyl groups" refers to trivalent functional groups derived from arenes (monocyclic and polycyclic aromatic hydrocarbons) by removal of three hydrogen atoms from ring carbon atoms.

As used herein, the term "substituted arenetriyl groups" refers to trivalent functional groups derived from substituted arenes by removal of three hydrogen atoms from ring carbon atoms. In this definition, the term "substituted arenes" has the same meaning as set forth above in the definition of substituted arenediyl groups.

As used herein, the term "heteroarenetriyl groups" refers to trivalent functional groups derived from heteroarenes by removal of three hydrogen atoms from ring atoms. In this definition, the term "heteroarenes" has the same meaning as set forth above in the definition of heteroarenediyl groups.

As used herein, the term "substituted heteroarenetriyl groups" refers to trivalent functional groups derived from substituted heteroarenes by removal of three hydrogen atoms from ring atoms. In this definition, the term "substituted heteroarenes" has the same meaning as set forth above in the definition of substituted heteroaryl groups.

In a first embodiment, the invention provides a polyethylene article produced from a molten polyethylene polymer. The article has a thickness, which is generally the smallest of the three dimensions of the article (i.e., the thickness is smaller than the length and width of the article). For example, in the context of a film, the thickness is the distances between the two major surfaces of the film. In the context of a pipe, the thickness is the distance between the inner and outer walls of the pipe.

The polyethylene article is produced from a molten polyethylene polymer. The polyethylene polymer can be provided in the form of a powder, fluff, flake, prill, or pellet made from freshly-produced polymer, polymer regrind, post-consumer waste, or post-industrial waste. The polymer is heated above its melting temperature to yield a flowable, molten mass than can then be processed to produce the article. In producing the article, the molten polymer is passed through an orifice or die (as in a film blowing process) or is introduced into a mold (as in an injection molding process). In each case, the molten polymer flows as the article is formed. In a relatively simple article, such as a blown film, the molten polymer flows in a single direction during the production of the article, which is the direction in which the polymer exits the die. In such cases, this direction (i.e., the direction in which the polymer flows when exiting the die) is referred to as the machine direction. The transverse direction of such an article is perpendicular to the machine direction and perpendicular to a line passing through the thickness of the article. The normal direction of such an article is perpendicular to the machine direction and the transverse direction and parallel to a line passing through the thickness of the article.

In a more complex article, such as an article having a complex geometry produced by injection molding, the polymer flows in multiple directions in order to fill voids in the mold cavity. While the flow pattern in such an article can be complex, it is still possible to determine the direction in which the polymer flows in an individual region within the article. This flow direction (i.e., the direction in which the polymer flows within the region when the article is produced) can be referred to as a local machine direction. Further, the flow pattern of the entire article can be determined to define a plurality of local machine directions, one for each region within the article where the polymer flow differs. Each local machine direction has a corresponding local transverse direction, which is perpendicular to the local machine direction in that region and perpendicular to a line passing through the thickness of the article. Each local machine direction also has a corresponding local normal direction, which is perpendicular to the local machine direction in that region and parallel to a line passing through the thickness of the article.

As noted above, the article comprises a polyethylene polymer. The polyethylene polymer is a semicrystalline polymer containing crystalline domains interspersed in an amorphous phase. At least some of the crystalline polyethylene is contained within lamellae in the polymer. Crystalline polyethylene assumes a body-centered orthorhombic unit cell having an a-axis, b-axis, and c-axis. The dimensions of the unit cell have been determined to be a×b×c=0.740 nm×0.493 nm×0.254 nm.

In the article of the invention, the b-axes of the crystalline polyethylene in the lamellae preferably are substantially aligned with the machine direction of the article. In the case of an article comprising a plurality of local machine directions, the b-axes of the crystalline polyethylene in the lamellae within each region (i.e., each region exhibiting a distinct flow direction) preferably are substantially aligned with the local machine direction in that region of the article. As noted above, this alignment of the b-axes of the crystalline polyethylene is believed to be unique among polyethylene articles. Known articles have only exhibited either an isotropic alignment or a preferential alignment of the b-axes in directions that are perpendicular to the machine direction. The orientation of elongated lamellae along the machine direction exhibited by the article of the invention is beneficial for many reasons. For instance, tear resistance in blown polyethylene films is typically the highest in the direction of lamellar growth (b-axis direction), as the amorphous tie-chains that "stitch" the crystalline lamellae together lie directly in the tear propagation path. Since blown polyethylene films almost always exhibit significant transverse (TD) lamellar growth as described in the Keller-Machin Type-I and II models, the tear resistance is very high in the TD direction, while very low in the MD direction. The article of the current invention exhibits substantially lower TD tear, while not changing MD tear significantly. Consequently, an article with balanced tear properties results, satisfying a long-felt need in the industry for such an article. Balanced tear properties have also been associated with improved drop impact in films, and is indeed shown by this novel orientation. Since the lamellae lie only in the two-dimensional film plane, the total crystallinity content of the whole matrix is localized within this plane. As a result, permeation rates to gases (water vapor, carbon dioxide, oxygen, hydrocarbons) and migratory species (fats, oils, slip agents) can decrease significantly through the normal direction of the films. Finally, the orientation of lamellae in the MD direction of blown films can induce extremely high tensile moduli in that direction, which is opposite to what is usually observed. Higher MD tensile modulus can allow faster winding rates on cast and blown film lines, as well as produce final articles with greater strength in a direction known for inherent weakness.

In molding processes, substantial MD orientation of lamellae results in exceptional bending (flexural) modulus across that direction, as well as extremely high heat deflection temperatures (HDT). As the b-axis direction is generally regarded as the lowest post-molding shrinkage direction, substantial reduction in MD shrinkage can be realized, and isotropic (balanced) shrinkage can result. In profile extruded articles such as pipe, elevated modulus across the machine direction can result in reduced sag and wall thickness distribution variations. Extrusion blow molded (EBM) or injection compression molded (ICM) articles with such an orientation can benefit from improved top load stiffness, in addition to reduced height or volume shrinkage, thus allowing for cycle time reductions on commercial equipment.

While not limited to any one application, the benefits that can be realized from such a unique crystalline orientation can generate new markets in areas limited by the current orientations observed in polyethylene articles today.

The orientation of the crystalline polyethylene can be determined using any suitable technique. Preferably, the orientation of the crystalline polyethylene is determined using wide angle x-ray pole figure analysis. Suitable techniques for evaluation the orientation using wide angle x-ray pole figure analysis are known to those of ordinary skill in the art, as shown, for example, in the article "Quantitative Pole Figure Analysis of Oriented Polyethylene Films" by Butler et al. (*Advances in X-ray Analysis*, Vol. 43 (1991), pp. 141-150). The Herman's orientation index can be used to quantify the degree of orientation. The Herman's orientation index (F) is calculated using the following equation:

$$F(X, y) = \frac{3\langle\cos^2\Phi\rangle - 1}{2}.$$

In the equation, X is a direction in the article, such as machine direction, transverse direction, or normal direction, and y is a crystallographic direction. The crystallographic direction can be characterized by either the axis (a, b, or c), or the diffraction planes that are perpendicular to the axis (002, 020, or 002). The 200 diffraction plane indicates the direction of the a-axis, the 020 diffraction plane indicates the direction of the b-axis, and the 002 diffraction plane indicates the direction of the c-axis. $\phi$ is the angle between the crystallographic axis of interest (y) and the direction of interest in the article (X). The function $\langle\cos^2\phi\rangle$, which can be calculated from the X-ray diffraction result, is the average of the $\cos^2\phi$ values of all the crystal units in the sample being measured. Thus, the Herman's orientation index can be used to quantify the degree to which any axis of the polyethylene cell unit is aligned to any of the process directions of the article (i.e., machine direction, transverse direction, or normal direction). When the axis of interest of all the crystal units in the sample is perfectly aligned with the direction of interest, $\langle\cos^2\phi\rangle$ equals 1 and F is equal to 1. When the axis of interest of all the crystal units in the sample is oriented perpendicular to the direction of interest, $\langle\cos^2\phi\rangle$ equals 0 and F is equal to −0.5. When the axis of interest of all the crystal units in the sample is randomly oriented with respect to the direction of interest, $\langle\cos^2\phi\rangle$ equals ⅓ and F is equal to 0.

As noted above, the b-axes of the crystalline polyethylene preferably are substantially aligned with the machine direction of the article. This preferential alignment in the machine direction can be quantified by comparing the Herman's orientation index of the b-axes in the machine direction (F(MD,020)) and the Herman's orientation indices of the b-axes in the transverse direction (F(TD,020)) and the normal direction (F(ND,020)). Preferably, the Herman's orientation index of the b-axes in the machine direction is greater than zero and greater than the orientation indices in both the transverse direction and normal direction. This can be expressed with the following inequalities: F(MD,020)>0; F(MD,020)>F(TD,020); and F(MD,020)>F(ND,020). In another preferred embodiment, the Herman's orientation indices satisfy the following inequalities: F(MD,020)>0.01; F(MD,020)−F(TD,020)>0.01; and F(MD,020)−F(ND,020)>0.01. In yet another preferred embodiment, the Herman's orientation indices satisfy the following inequalities: F(MD,020)>0.05; F(MD,020)−F(TD,020)>0.05; and F(MD,020)−F(ND,020)>0.05. As noted above, this preferential orientation is even displayed by articles having multiple local machine directions. In such case, the Herman's orientation index of the b-axes in the local machine direction is greater than zero and greater than the orientation indices in both the local transverse direction and local normal direction. This can be expressed with the following inequalities: $F(MD_{local},020)>0$; $F(MD_{local},020)>F(TD_{local},020)$; and $F(MD_{local},020)>F(ND_{local},020)$. In another preferred embodiment, the Herman's orientation indices satisfy the following inequalities: $F(MD_{local},020)>0.01$; $F(MD_{local},020)−F(TD_{local},020)>0.01$; and $F(MD_{local},020)−F(ND_{local},020)>0.01$. In yet another preferred embodiment, the Herman's orientation indices satisfy the following inequalities: $F(MD_{local},020)>0.05$; $F(MD_{local},020)−F(TD_{local},020)>0.05$; and $F(MD_{local},020)−F(ND_{local},020)>0.05$.

The article can comprise any suitable polyethylene polymer. Suitable polyethylenes include, but are not limited to, low density polyethylene, linear low density polyethylene, medium density polyethylene, high density polyethylene, and combinations thereof. In certain preferred embodiments, the polyethylene polymer is selected from the group consisting of linear low density polyethylene, high density polyethylene, and mixtures thereof. In another preferred embodiment, the polyethylene polymer is a high density polyethylene.

The high density polyethylene polymers suitable for use in the invention generally have a density of greater than about 0.940 g/cm³. There is no upper limit to the suitable density of the polymer, but high density polyethylene polymers typically have a density that is less than about 0.980 g/cm³ (e.g., less than about 0.975 g/cm³).

The high density polyethylene polymers suitable for use in the invention can be either homopolymers or copolymers of ethylene with one or more α-olefins. Suitable α-olefins include, but are not limited to, 1-butene, 1-hexene, 1-octene, 1-decene, and 4-methyl-1-pentene. The comonomer can be present in the copolymer in any suitable amount, such as an amount of about 5% by weight or less (e.g., about 3 mol. % or less). As will be understood by those of ordinary skill in the art, the amount of comonomer suitable for the copolymer is largely driven by the end use for the copolymer and the required or desired polymer properties dictated by that end use.

The high density polyethylene polymers suitable for use in the invention can be produced by any suitable process. For example, the polymers can be produced by a free radical process using very high pressures as described, for example, in U.S. Pat. No. 2,816,883 (Larchar et al.), but the polymers typically are produced in a "low pressure" catalytic process. In this context, the term "low pressure" is used to denote processes carried out at pressures less than 6.9 MPa (e.g., 1,000 psig), such as 1.4-6.9 MPa (200-1,000 psig). Examples of suitable low pressure catalytic processes include, but are not limited to, solution polymerization processes (i.e., processes in which the polymerization is performed using a solvent for the polymer), slurry polymerization processes (i.e., processes in which the polymerization is performed using a hydrocarbon liquid in which the polymer does not dissolve or swell), gas-phase polymerization processes (e.g., processes in which the polymerization is performed without the use of a liquid medium or diluent), or a staged reactor polymerization process. The suitable gas-phase polymerization processes also include the so-called "condensed mode" or "super-condensed mode" processes in which a liquid hydrocarbon is introduced into the fluidized-bed to increase the absorption of the heat producing during the polymerization process. In these condensed mode and super-condensed mode processes, the liquid hydrocarbon typically is condensed in the recycle stream and reused in the reactor. The staged reactor processes can utilize a combination of slurry process reactors (tanks or loops) that are connected in series, parallel, or a combination of series or parallel so that the catalyst (e.g., chromium catalyst) is exposed to more than one set of reaction conditions. Staged reactor processes can also be carried out by combining two loops in series, combining one or more tanks and loops in series, using multiple gas-phase reactors in series, or a loop-gas phase arrangement. Because of their ability to expose the catalyst to different sets of reactor conditions, staged reactor processes are often used to produce multimodal polymers, such as those discussed below. Suitable processes also include those in which a pre-polymerization step is performed. In this pre-polymerization step, the catalyst typically is exposed to the cocatalyst and ethylene under mild conditions in a smaller, separate reactor, and the polymerization reaction is allowed to proceed until the catalyst comprises a relatively small amount (e.g., about 5% to about 30% of the total weight) of the resulting composition. This pre-polymerized catalyst is then introduced to the large-scale reactor in which the polymerization is to be performed.

The high density polyethylene polymers suitable for use in the invention can be produced using any suitable catalyst or combination of catalysts. Suitable catalysts include transition metal catalysts, such as supported reduced molybdenum oxide, cobalt molybdate on alumina, chromium oxide, and transition metal halides. Chromium oxide catalysts typically are produced by impregnating a chromium compound onto a porous, high surface area oxide carrier, such as silica, and then calcining it in dry air at 500-900° C. This converts the chromium into a hexavalent surface chromate ester or dichromate ester. The chromium oxide catalysts can be used in conjunction with metal alkyl cocatalysts, such as alkyl boron, alkyl aluminum, alkyl zinc, and alkyl lithium. Supports for the chromium oxide include silica, silica-titania, silica-alumina, alumina, and aluminophosphates. Further examples of chromium oxide catalysts include those catalysts produced by depositing a lower valent organochromium compound, such as bis(arene) $Cr^0$, allyl $Cr^{2+}$ and $Cr^{3+}$, beta stabilized alkyls of $Cr^{2+}$ and $Cr^{4+}$, and bis (cyclopentadienyl) $Cr^{2+}$, onto a chromium oxide catalyst, such as those described above. Suitable transition metal catalysts also include supported chromium catalysts such as those based on chromocene or a silylchromate (e.g., bi(tris-phenylsilyl)chromate). These chromium catalysts can be supported on any suitable high surface area support such as those described above for the chromium oxide catalysts, with silica typically being used. The supported chromium catalysts can also be used in conjunction with cocatalysts, such as the metal alkyl cocatalysts listed above for the chromium oxide catalysts. Suitable transition metal halide catalysts include titanium (III) halides (e.g., titanium (III) chloride), titanium (IV) halides (e.g., titanium (IV) chloride), vanadium halides, zirconium halides, and combinations thereof. These transition metal halides are often supported on a high surface area solid, such as magnesium chloride. The transition metal halide catalysts are typically used in conjunction with an aluminum alkyl cocatalyst, such as trimethylaluminum (i.e., $Al(CH_3)_3$) or triethylaluminum (i.e., $Al(C_2H_5)_3$). These transition metal halides may also be used in staged reactor processes. Suitable catalysts also include metallocene catalysts, such as cyclopentadienyl titanium halides (e.g., cyclopentadienyl titanium chlorides), cyclopentadienyl zirconium halides (e.g., cyclopentadienyl zirconium chlorides), cyclopentadienyl hafnium halides (e.g., cyclopentadienyl hafnium chlorides), and combinations thereof. Metallocene catalysts based on transition metals complexed with indenyl or fluorenyl ligands are also known and can be used to produce high density polyethylene polymers suitable for use in the invention. The catalysts typically contain multiple ligands, and the ligands can be substituted with various groups (e.g., n-butyl group) or linked with bridging groups, such as —$CH_2CH_2$— or >$SiPh_2$. The metallocene catalysts typically are used in conjunction with a cocatalyst, such as methyl aluminoxane (i.e., $(Al(CH_3)_xO_y)_n$. Other cocatalysts include those described in U.S. Pat. No. 5,919,983 (Rosen et al.), U.S. Pat. No. 6,107,230 (McDaniel et al.), U.S. Pat. No. 6,632,894 (McDaniel et al.), and U.S. Pat. No. 6,300,271 (McDaniel et al). Other "single site" catalysts suitable for use in producing high density polyethylene include diimine complexes, such as those described in U.S. Pat. No. 5,891,963 (Brookhart et al.).

The high density polyethylene polymers suitable for use in the invention can have any suitable molecular weight (e.g., weight average molecular weight). For example, the weight average molecular weight of the high density polyethylene can be from 20,000 g/mol to about 1,000,000 g/mol or more. As will be understood by those of ordinary skill in the art, the suitable weight average molecular weight of the high density polyethylene will depend, at least in part, on the particular application or end use for which the polymer is destined. For example, a high density polyethylene polymer intended for blow molding applications can have a weight average molecular weight of about 100,000 g/mol to about 1,000,000 g/mol. A high density polyethylene polymer intended for pipe applications or film applications can have a weight average molecular weight of about 100,000 g/mol to about 500,000 g/mol. A high density polyethylene polymer intended for injection molding applications can have a weight average molecular weight of about 20,000 g/mol to about 80,000 g/mol. A high density polyethylene polymer intended for wire insulation applications, cable insulation applications, tape applications, or filament applications can have a weight average molecular weight of about 80,000 g/mol to about 400,000 g/mol. A high density polyethylene polymer intended for rotomolding applications can have a weight average molecular weight of about 50,000 g/mol to about 150,000 g/mol.

The high density polyethylene polymers suitable for use in the invention can also have any suitable polydispersity, which is defined as the value obtained by dividing the weight average molecular weight of the polymer by the number average molecular weight of the polymer. For example, the high density polyethylene polymer can have a polydispersity of greater than 2 to about 100. As understood by those skilled in the art, the polydispersity of the polymer is heavily influenced by the catalyst system used to produce the polymer, with the metallocene and other "single site" catalysts generally producing polymers with relatively low polydispersity and narrow molecular weight distributions and the other transition metal catalysts (e.g., chromium catalysts) producing polymers with higher polydispersity and broader molecular weight distributions. The high density polyethylene polymers suitable for use in the invention can also have a multimodal (e.g., bimodal) molecular weight distribution. For example, the polymer can have a first fraction having a relatively low molecular weight and a second fraction having a relatively high molecular weight. The difference between the weight average molecular weight of the fractions in the polymer can be any suitable amount. In fact, it is not necessary for the difference between the weight average molecular weights to be large enough that two distinct molecular weight fractions can be resolved using gel permeation chromatography (GPC). However, in certain multimodal polymers, the difference between the weight average molecular weights of the fractions can be great enough that two or more distinct peaks can be resolved from the GPC curve for the polymer. In this context, the term "distinct" does not necessarily mean that the portions of the GPC curve corresponding to each fraction do not overlap, but is merely meant to indicate that a distinct peak for each fraction can be resolved from the GPC curve for the polymer. The multimodal polymers suitable for use in the invention can be produced using any suitable process. As noted above, the multimodal polymers can be produced using staged reactor processes. One suitable example would be a staged solution process incorporating a series of stirred tanks. Alternatively, the multimodal polymers can be produced in a single reactor using a combination of catalysts each of which is designed to produce a polymer having a different weight average molecular weight.

The high density polyethylene polymers suitable for use in the invention can have any suitable melt index. For example, the high density polyethylene polymer can have a melt index of about 0.01 dg/min to about 40 dg/min. As with the weight average molecular weight, those of ordinary skill in the art understand that the suitable melt index for the high density polyethylene polymer will depend, at least in part, on the particular application or end use for which the polymer is destined. Thus, for example, a high density polyethylene polymer intended for blow molding applications can have a melt index of about 0.01 dg/min to about 1 dg/min. A high density polyethylene polymer intended for blown film applications can have a melt index of about 0.5 dg/min to about 3 dg/min. A high density polyethylene polymer intended for cast film applications can have a melt index of about 2 dg/min to about 10 dg/min. A high density polyethylene polymer intended for pipe applications can have a melt index of about 2 dg/min to about 40 dg/min. A high density polyethylene polymer intended for injection molding applications can have a melt index of about 2 dg/min to about 80 dg/min. A high density polyethylene polymer intended for rotomolding applications can have a melt index of about 0.5 dg/min to about 10 dg/min. A high density polyethylene polymer intended for tape applications can have a melt index of about 0.2 dg/min to about 4 dg/min. A high density polyethylene polymer intended for filament applications can have a melt index of about 1 dg/min to about 20 dg/min. The melt index of the polymer is measured using ASTM Standard D1238-04c.

The high density polyethylene polymers suitable for use in the invention generally do not contain high amounts of long-chain branching. The term "long-chain branching" is used to refer to branches that are attached to the polymer chain and are of sufficient length to affect the rheology of the polymer (e.g., branches of about 130 carbons or more in length). If desired for the application in which the polymer is to be used, the high density polyethylene polymer can contain small amounts of long-chain branching. However, the high density polyethylene polymers suitable for use in the invention typically contain very little long-chain branching (e.g., less than about 1 long-chain branch per 10,000 carbons, less than about 0.5 long-chain branches per 10,000 carbons, less than about 0.1 long-chain branches per 10,000 carbons, or less than about 0.01 long-chain branches per 10,000 carbons).

The medium density polyethylene polymers suitable for use in the invention generally have a density of about 0.926 g/cm$^3$ to about 0.940 g/cm$^3$. The term "medium density polyethylene" is used to refer to polymers of ethylene that have a density between that of high density polyethylene and linear low density polyethylene and contain relatively short branches, at least as compared to the long branches present in low density polyethylene polymers produced by the free radical polymerization of ethylene at high pressures.

The medium density polyethylene polymers suitable for use in the invention generally are copolymers of ethylene and at least one α-olefin, such as 1-butene, 1-hexene, 1-octene, 1-decene, and 4-methyl-1-pentene. The α-olefin comonomer can be present in any suitable amount, but typically is present in an amount of less than about 8% by weight (e.g., less than about 5 mol %). As will be understood by those of ordinary skill in the art, the amount of comonomer suitable for the copolymer is largely driven by the end use for the copolymer and the required or desired polymer properties dictated by that end use.

The medium density polyethylene polymers suitable for use in the invention can be produced by any suitable process. Like the high density polyethylene polymers, the medium density polyethylene polymers typically are produced in "low pressure" catalytic processes such as any of the processes described above in connection with the high density polyethylene polymers suitable for use in the invention. Examples of suitable processes include, but are not limited to, gas-phase polymerization processes, solution polymerization processes, slurry polymerization processes, and staged reactor processes. Suitable staged reactor processes can incorporate any suitable combination of the gas-phase, solution, and slurry polymerization processes described above. As with high density polyethylene polymers, staged reactor processes are often used to produce multimodal polymers.

The medium density polyethylene polymers suitable for use in the invention can be produced using any suitable catalyst or combination of catalysts. For example, the polymers can be produced using Ziegler catalysts, such as transition metal (e.g., titanium) halides or esters used in combination with organoaluminum compounds (e.g., triethylaluminum). These Ziegler catalysts can be supported on, for example, magnesium chloride, silica, alumina, or magnesium oxide. The medium density polyethylene polymers suitable for use in the invention can also be produced using so-called "dual Ziegler catalysts," which contain one catalyst species for dimerizing ethylene into 1-butene (e.g., a combination of a titanium ester and triethylaluminum) and another catalyst for copolymerization of ethylene and the generated 1-butene (e.g., titanium chloride supported on magnesium chloride). The medium density polyethylene polymers suitable for use in the invention can also be produced using chromium oxide catalysts, such as those produced by depositing a chromium compound onto a silica-titania support, oxidizing the resulting catalyst in a mixture of oxygen and air, and then reducing the catalyst with carbon monoxide. These chromium oxide catalysts typically are used in conjunction with cocatalysts such as trialkylboron or trialkylaluminum compounds. The chromium oxide catalysts can also be used in conjunction with a Ziegler catalyst, such as a titanium halide- or titanium ester-based catalyst. The medium density polyethylene polymers suitable for use in the invention can also be produced using supported chromium catalysts such as those described above in the discussion of catalysts suitable for making high density polyethylene. The medium density polyethylene polymers suitable for use in the invention can also be produced using metallocene catalysts. Several different types of metallocene catalysts can be used. For example, the metallocene catalyst can contain a bis(metallocene) complex of zirconium, titanium, or hafnium with two cyclopentadienyl rings and methylaluminoxane. As with the catalysts used in high density polyethylene production, the ligands can be substituted with various groups (e.g., n-butyl group) or linked with bridging groups. Another class of metallocene catalysts that can be used are composed of bis(metallocene) complexes of zirconium or titanium and anions of perfluorinated boronaromatic compounds. A third class of metallocene catalysts that can be used are referred to as constrained-geometry catalysts and contain monocyclopentadienyl derivatives of titanium or zirconium in which one of the carbon atoms in the cyclopentadienyl ring is linked to the metal atom by a bridging group. These complexes are activated by reacting them with methylaluminoxane or by forming ionic complexes with noncoordinative anions, such as $B(C_6F_5)_4^-$ or $B(C_6F_5)_3CH_3^-$. A fourth class of metallocene catalysts that can be used are metallocene-based complexes of a transition metal, such as titanium, containing one cyclopentadienyl ligand in combination with another ligand, such as a phosphinimine or —O—SiR$_3$. This class of metallocene catalyst is also activated with methylaluminoxane or a boron compound. Other catalysts suitable for use in making the medium density polyethylene suitable for use in the invention include, but are not limited to, the catalysts disclosed in U.S. Pat. No. 6,649,558.

The medium density polyethylene polymers suitable for use in the invention can have any suitable compositional uniformity, which is a term used to describe the uniformity of the branching in the copolymer molecules of the polymer. Many commercially-available medium density polyethylene polymers have a relatively low compositional uniformity in which the high molecular weight fraction of the polymer contains relatively little of the α-olefin comonomer and has relatively little branching while the low molecular weight fraction of the polymer contains a relatively high amount of the α-olefin comonomer and has a relatively large amount of branching. Alternatively, another set of medium density polyethylene polymers have a relatively low compositional uniformity in which the high molecular weight fraction of the polymer contains a relatively high amount of the α-olefin comonomer while the low molecular weight fraction of the polymer contains relatively little of the α-olefin comonomer. The compositional uniformity of the polymer can be measured using any suitable method, such as temperature rising elution fractionation.

The medium density polyethylene polymers suitable for use in the invention can have any suitable molecular weight. For example, the polymer can have a weight average molecular weight of about 50,000 g/mol to about 200,000 g/mol. As will be understood by those of ordinary skill in the art, the suitable weight average molecular weight of the medium density polyethylene will depend, at least in part, on the particular application or end use for which the polymer is destined.

The medium density polyethylene polymers suitable for use in the invention can also have any suitable polydispersity. Many commercially available medium density polyethylene polymers have a polydispersity of about 2 to about 30. The medium density polyethylene polymers suitable for use in the invention can also have a multimodal (e.g., bimodal) molecular weight distribution. For example, the polymer can have a first fraction having a relatively low molecular weight and a second fraction having a relatively high molecular weight. As with the high density polyethylene polymers suitable for use in the invention, the difference between the weight average molecular weight of the fractions in the multimodal medium density polyethylene polymer can be any suitable amount. In fact, it is not necessary for the difference between the weight average molecular weights to be large enough that two distinct molecular weight fractions can be resolved using gel permeation chromatography (GPC). However, in certain multimodal polymers, the difference between the weight average molecular weights of the fractions can be great enough that two or more distinct peaks can be resolved from the GPC curve for the polymer. In this context, the term "distinct" does not necessarily mean that the portions of the GPC curve corresponding to each fraction do not overlap, but is merely meant to indicate that a distinct peak for each fraction can be resolved from the GPC curve for the polymer. The multimodal polymers suitable for use in the invention can be produced using any suitable process. As noted above, the multimodal polymers can be produced using staged reactor processes. One suitable example would be a staged solution process incorporating a series of stirred tanks. Alternatively, the multimodal polymers can be produced in a single reactor using a combination of catalysts each of which is designed to produce a polymer having a different weight average molecular weight The medium density polyethylene polymers suitable for use in the invention can have any suitable melt index. For example, the medium density polyethylene polymer can have a melt index of about 0.01 dg/min to about 200 dg/min. As with the weight average molecular weight, those of ordinary skill in the art understand that the suitable melt index for the medium density polyethylene polymer will depend, at least in part, on the particular application or end use for which the polymer is destined. Thus, for example, a medium density polyethylene polymer intended for blow molding applications or pipe applications can have a melt index of about 0.01 dg/min to about 1 dg/min. A medium density polyethylene polymer intended for blown film applications can have a melt index of about 0.5 dg/min to about 3 dg/min. A medium density polyethylene polymer intended for cast film applications can have a melt index of about 2 dg/min to about 10 dg/min. A medium density polyethylene polymer intended for injection molding applications can have a melt index of about 6 dg/min to about 200 dg/min. A medium density polyethylene polymer intended for rotomolding applications can have a melt index of about 4 dg/min to about 7 dg/min. A medium density polyethylene polymer intended for wire and cable insulation applications can have a melt index of about 0.5 dg/min to about 3 dg/min. The melt index of the polymer is measured using ASTM Standard D1238-04c.

The medium density polyethylene polymers suitable for use in the invention generally do not contain a significant amount of long-chain branching. For example, the medium density polyethylene polymers suitable for use in the invention generally contain less than about 0.1 long-chain branches per 10,000 carbon atoms (e.g., less than about 0.002 long-chain branches per 100 ethylene units) or less than about 0.01 long-chain branches per 10,000 carbon atoms.

The linear low density polyethylene polymers suitable for use in the invention generally have a density of 0.925 g/cm³ or less (e.g., about 0.910 g/cm³ to about 0.925 g/cm³). The term "linear low density polyethylene" is used to refer to lower density polymers of ethylene having relatively short branches, at least as compared to the long branches present in low density polyethylene polymers produced by the free radical polymerization of ethylene at high pressures.

The linear low density polyethylene polymers suitable for use in the invention generally are copolymers of ethylene and at least one α-olefin, such as 1-butene, 1-hexene, 1-octene, 1-decene, and 4-methyl-1-pentene. The α-olefin comonomer can be present in any suitable amount, but typically is present in an amount of less than about 6 mol. % (e.g., about 2 mol % to about 5 mol %). As will be understood by those of ordinary skill in the art, the amount of comonomer suitable for the copolymer is largely driven by the end use for the copolymer and the required or desired polymer properties dictated by that end use.

The linear low density polyethylene polymers suitable for use in the invention can be produced by any suitable process. Like the high density polyethylene polymers, the linear low density polyethylene polymers typically are produced in "low pressure" catalytic processes such as any of the processes described above in connection with the high density polyethylene polymers suitable for use in the invention. Suitable processes include, but are not limited to, gas-phase polymerization processes, solution polymerization processes, slurry polymerization processes, and staged reactor processes. Suitable staged reactor processes can incorporate any suitable combination of the gas-phase, solution, and slurry polymerization processes described above. As with high density polyethylene polymers, staged reactor processes are often used to produce multimodal polymers.

The linear low density polyethylene polymers suitable for use in the invention can be produced using any suitable catalyst or combination of catalysts. For example, the polymers can be produced using Ziegler catalysts, such as transition metal (e.g., titanium) halides or esters used in combination with organoaluminum compounds (e.g., triethylaluminum). These Ziegler catalysts can be supported on, for example, magnesium chloride, silica, alumina, or magnesium oxide. The linear low density polyethylene polymers suitable for use in the invention can also be produced using so-called "dual Ziegler catalysts," which contain one catalyst species for dimerizing ethylene into 1-butene (e.g., a combination of a titanium ester and triethylaluminum) and another catalyst for copolymerization of ethylene and the generated 1-butene (e.g., titanium chloride supported on magnesium chloride). The linear low density polyethylene polymers suitable for use in the invention can also be produced using chromium oxide catalysts, such as those produced by depositing a chromium compound onto a silica-titania support, oxidizing the resulting catalyst in a mixture of oxygen and air, and then reducing the catalyst with carbon monoxide. These chromium oxide catalysts typically are used in conjunction with cocatalysts such as trialkylboron or trialkylaluminum compounds. The chromium oxide catalysts can also be used in conjunction with a Ziegler catalyst, such as a titanium halide- or titanium ester-based catalyst. The linear low density polyethylene polymers suitable for use in the invention can also be produced using supported chromium catalysts such as those described above in the discussion of catalysts suitable for making high density polyethylene. The linear low density polyethylene suitable for use in the invention can also be produced using metallocene catalysts. Several different types of metallocene catalysts can be used. For example, the metallocene catalyst can contain a bis(metallocene) complex of zirconium, titanium, or hafnium with two cyclopentadienyl rings and methylaluminoxane. As with the catalysts used in high density polyethylene production, the ligands can be substituted with various groups (e.g., n-butyl group) or linked with bridging groups. Another class of metallocene catalysts that can be used are composed of bis(metallocene) complexes of zirconium or titanium and anions of perfluorinated boroaromatic compounds. A third class of metallocene catalysts that can be used are referred to as constrained-geometry catalysts and contain monocyclopentadienyl derivatives of titanium or zirconium in which one of the carbon atoms in the cyclopentadienyl ring is linked to the metal atom by a bridging group. These complexes are activated by reacting them with methylaluminoxane or by forming ionic complexes with noncoordinative anions, such as $B(C_6F_5)_4^-$ or $B(C_6F_5)_3CH_3^-$. A fourth class of metallocene catalysts that can be used are metallocene-based complexes of a transition metal, such as titanium, containing one cyclopentadienyl ligand in combination with another ligand, such as a phosphinimine or —O—$SiR_3$. This class of metallocene catalyst is also activated with methylaluminoxane or a boron compound. Other catalysts suitable for use in making the linear low density polyethylene suitable for use in the invention include, but are not limited to, the catalysts disclosed in U.S. Pat. No. 6,649,558.

The linear low density polyethylene polymers suitable for use in the invention can have any suitable compositional uniformity, which is a term used to describe the uniformity of the branching in the copolymer molecules of the polymer. Many commercially-available linear low density polyethylene polymers have a relatively low compositional uniformity in which the high molecular weight fraction of the polymer contains relatively little of the α-olefin comonomer and has relatively little branching while the low molecular weight fraction of the polymer contains a relatively high amount of the α-olefin comonomer and has a relatively large amount of branching. Alternatively, another set of linear low density polyethylene polymers have a relatively low compositional uniformity in which the high molecular weight fraction of the polymer contains a relatively high amount of the α-olefin comonomer while the low molecular weight fraction of the polymer contains relatively little of the α-olefin comonomer. The compositional uniformity of the polymer can be measured using any suitable method, such as temperature rising elution fractionation.

The linear low density polyethylene polymers suitable for use in the invention can have any suitable molecular weight. For example, the polymer can have a weight average molecular weight of about 20,000 g/mol to about 250,000 g/mol. As will be understood by those of ordinary skill in the art, the suitable weight average molecular weight of the linear low density polyethylene will depend, at least in part, on the particular application or end use for which the polymer is destined.

The linear low density polyethylene polymers suitable for use in the invention can also have any suitable polydispersity. Many commercially available linear low density polyethylene polymers have a relatively narrow molecular weight distribution and thus a relatively low polydispersity, such as about 2 to about 5 (e.g., about 2.5 to about 4.5 or about 3.5 to about 4.5). The linear low density polyethylene polymers suitable for use in the invention can also have a multimodal (e.g., bimodal) molecular weight distribution. For example, the polymer can have a first fraction having a relatively low molecular weight and a second fraction having a relatively high molecular weight. As with the high density polyethylene polymers suitable for use in the invention, the difference between the weight average molecular weight of the fractions in the multimodal linear low density polyethylene polymer can be any suitable amount. In fact, it is not necessary for the difference between the weight average molecular weights to be large enough that two distinct molecular weight fractions can be resolved using gel permeation chromatography (GPC). However, in certain multimodal polymers, the difference between the weight average molecular weights of the fractions can be great enough that two or more distinct peaks can be resolved from the GPC curve for the polymer. In this context, the term "distinct" does not necessarily mean that the portions of the GPC curve corresponding to each fraction do not overlap, but is merely meant to indicate that a distinct peak for each fraction can be resolved from the GPC curve for the polymer. The multimodal polymers suitable for use in the invention can be produced using any suitable process. As noted above, the multimodal polymers can be produced using staged reactor processes. One suitable example would be a staged solution process incorporating a series of stirred tanks. Alternatively, the multimodal polymers can be produced in a single reactor using a combination of catalysts each of which is designed to produce a polymer having a different weight average molecular weight The linear low density polyethylene polymers suitable for use in the invention can have any suitable melt index. For example, the linear low density polyethylene polymer can have a melt index of about 0.01 dg/min to about 200 dg/min. As with the weight average molecular weight, those of ordinary skill in the art understand that the suitable melt index for the linear low density polyethylene polymer will depend, at least in part, on the particular application or end use for which the polymer is destined. Thus, for example, a linear low density polyethylene polymer intended for blow molding applications or pipe applications can have a melt index of about 0.01 dg/min to about 1 dg/min. A linear low density polyethylene polymer intended for blown film applications can have a melt index of about 0.5 dg/min to about 3 dg/min. A linear low density polyethylene polymer intended for cast film applications can have a melt index of about 2 dg/min to about 10 dg/min. A linear low density polyethylene polymer intended for injection molding applications can have a melt index of about 6 dg/min to about 200 dg/min. A linear low density polyethylene polymer intended for rotomolding applications can have a melt index of about 4 dg/min to about 7 dg/min. A linear low density polyethylene polymer intended for wire and cable insulation applications can have a melt index of about 0.5 dg/min to about 3 dg/min. The melt index of the polymer is measured using ASTM Standard D1238-04c.

The linear low density polyethylene polymers suitable for use in the invention generally do not contain a significant amount of long-chain branching. For example, the linear low density polyethylene polymers suitable for use in the invention generally contain less than about 0.1 long-chain branches per 10,000 carbon atoms (e.g., less than about 0.002 long-chain branches per 100 ethylene units) or less than about 0.01 long-chain branches per 10,000 carbon atoms.

The low density polyethylene polymers suitable for use in the invention generally have a density of less than 0.935 g/cm$^3$ and, in contrast to high density polyethylene, medium density polyethylene and linear low density polyethylene, have a relatively large amount of long-chain branching in the polymer.

The low density polyethylene polymers suitable for use in the invention can be either ethylene homopolymers or copolymers of ethylene and a polar comonomer. Suitable polar comonomers include, but are not limited to, vinyl acetate, methyl acrylate, ethyl acrylate, and acrylic acid. These comonomers can be present in any suitable amount, with comonomer contents as high as 20% by weight being used for certain applications. As will be understood by those skilled in the art, the amount of comonomer suitable for the polymer is largely driven by the end use for the polymer and the required or desired polymer properties dictated by that end use.

The low density polyethylene polymers suitable for use in the invention can be produced using any suitable process, but typically the polymers are produced by the free-radical initiated polymerization of ethylene at high pressure (e.g., about 81 to about 276 MPa) and high temperature (e.g., about 130 to about 330° C.). Any suitable free radical initiator can be used in such processes, with peroxides and oxygen being the most common. The free-radical polymerization mechanism gives rise to short-chain branching in the polymer and also to the relatively high degree of long-chain branching that distinguishes low density polyethylene from other ethylene polymers (e.g., high density polyethylene and linear low density polyethylene). The polymerization reaction typically is performed in an autoclave reactor (e.g., a stirred autoclave reactor), a tubular reactor, or a combination of such reactors positioned in series.

The low density polyethylene polymers suitable for use in the invention can have any suitable molecular weight. For example, the polymer can have a weight average molecular weight of about 30,000 g/mol to about 500,000 g/mol. As will be understood by those of ordinary skill in the art, the suitable weight average molecular weight of the low density polyethylene will depend, at least in part, on the particular application or end use for which the polymer is destined. For example, a low density polyethylene polymer intended for blow molding applications can have a weight average molecular weight of about 80,000 g/mol to about 200,000 g/mol. A low density polyethylene polymer intended for pipe applications can have a weight average molecular weight of about 80,000 g/mol to about 200,000 g/mol. A low density polyethylene polymer intended for injection molding applications can have a weight average molecular weight of about 30,000 g/mol to about 80,000 g/mol. A low density polyethylene polymer intended for film applications can have a weight average molecular weight of about 60,000 g/mol to about 500,000 g/mol.

The low density polyethylene polymers suitable for use in the invention can have any suitable melt index. For example, the low density polyethylene polymer can have a melt index of about 0.2 to about 100 dg/min. As noted above, the melt index of the polymer is measured using ASTM Standard D1238-04c.

As noted above, one of the major distinctions between low density polyethylene and other ethylene polymers is a relatively high degree of long-chain branching within the polymer. The low density polyethylene polymers suitable for use in the invention can exhibit any suitable amount of long-chain branching, such as about 0.01 or more long-chain branches per 10,000 carbon atoms, about 0.1 or more long-chain branches per 10,000 carbon atoms, about 0.5 or more long-chain branches per 10,000 carbon atoms, about 1 or more long-chain branches per 10,000 carbon atoms, or about 4 or more long-chain branches per 10,000 carbon atoms. While there is not a strict limit on the maximum extent of long-chain branching that can be present in the low density polyethylene polymers suitable for use in the invention, the long-chain branching in many low density polyethylene polymers is less than about 100 long-chain branches per 10,000 carbon atoms.

In addition to the polyethylene polymer, the article can comprise a nucleating agent for the polyethylene polymer. As utilized herein, the term "nucleating agent" is used to refer to compounds or additives that form nuclei or provide sites for the formation and/or growth of crystals in a polymer as it solidifies from a molten state. In one embodiment, the nucleating agent comprises a compound conforming to the structure of Formula (I)

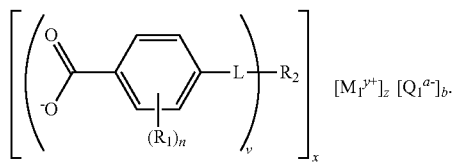 (I)

In the structure of Formula (I), $R_1$ is selected from the group consisting of hydroxy, halogens, alkyl groups, substituted alkyl groups, alkoxy groups, substituted alkoxy groups, aryl groups, and substituted aryl groups. The variable n is zero or a positive integer from 1 to 4. L is a linking group comprising two or more atoms and at least one double bond between two atoms in the linking group. The variable v is a positive integer from 1 to 3. $R_2$ is: (i) selected from the group consisting of alkyl groups, substituted alkyl groups, cycloalkyl groups, substituted cycloalkyl groups, aryl groups, substituted aryl groups, heteroaryl groups, and substituted heteroaryl groups when L is a divalent linking group and v is 1, (ii) selected from the group consisting of alkanediyl groups, substituted alkanediyl groups, cycloalkanediyl groups, substituted cycloalkanediyl groups, arenediyl groups, substituted arenediyl groups, heteroarenediyl groups, and substituted heteroarenediyl groups when L is a trivalent linking group and v is 1, (iii) selected from the group consisting of alkanediyl groups, substituted alkanediyl groups, cycloalkanediyl groups, substituted cycloalkanediyl groups, arenediyl groups, substituted arenediyl groups, heteroarenediyl groups, and substituted heteroarenediyl groups when L is a divalent linking group and v is 2, and (iv) selected from the group consisting of alkanetriyl groups, substituted alkanetriyl groups, cycloalkanetriyl groups, substituted cycloalkanetriyl groups, arenetriyl groups, substituted arenetriyl groups, heteroarenetriyl groups, and substituted heteroarenetriyl groups when L is a divalent linking group and v is 3. The variable x is a positive integer. Each $M_1$ is a metal cation; the variable y is the valence of the cation; and the variable z is a positive integer. The variable b is zero or a positive integer. When b is a positive integer, each $Q_1$ is a negatively-charged counterion, and a is the valence of the negatively-charged counterion. The values of v, x, y, z, a, and b satisfy the equation $(vx)+(ab)=yz$. In the structure of Formula (I), the cyclic portion of the cycloalkyl group or substituted cycloalkyl group comprises no more than two ring structures fused together when L is a divalent linking group, v is 1, and $R_2$ is a cycloalkyl group or a substituted cycloalkyl group.

In a preferred embodiment, $R_1$ is a halogen or hydroxy, with n=1 being particularly preferred. In a more specific embodiment, n can be 1, $R_1$ can be hydroxy and attached to the aryl ring in the ortho position relative to the carboxylate group. In another preferred embodiment, n is 0, meaning that the carboxylate-substituted aryl ring is not substituted with $R_1$ groups.

L is a linking group comprising two or more atoms and at least one double bond between two atoms in the linking group. With at least one double bond between two atoms in the linking group, two of the atoms in the linking group are $sp^2$ hybridized and the sum of the bond angles around at least one of these atoms is approximately 360 degrees. The presence of the double bond within the liking group restricts rotation of the molecule around the double bond and, while not wishing to be bound to any particular theory, is believed to maintain the compound in a configuration that is more favorable for nucleation of the polymer. In a series of preferred embodiments, L is selected from the group consisting of moieties conforming to the structure of one of Formulae (LA)-(LF) below

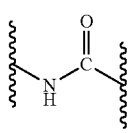 (LA)

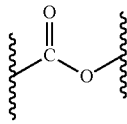 (LB)

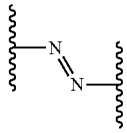 (LC)

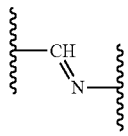
(LD)

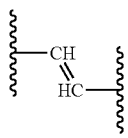
(LE)

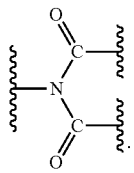
(LF)

As can be seen from these structures, suitable linking groups comprise at least two atoms and a double bond between two atoms in the linking group. With each of these L groups, any suitable end of the linking group can be attached to the carboxylate-substituted aryl ring and the other end(s) can be attached to the group $R_2$. In a preferred embodiment, L is a moiety selecting from the group consisting of moieties conforming to the structure of Formulae (LA) and (LD). In a particularly preferred embodiment, L is a moiety conforming to the structure of Formula (LA). In such an embodiment, the moiety can have the nitrogen atom bonded to the carboxylate-substituted aryl ring or the group $R_2$.

The group $R_2$ can be a monovalent, divalent, or trivalent moiety. The valence of $R_2$ depends on the valence of the linking group L and the number of carboxylate-substituted aryl rings in the compound. Thus, when L is a divalent linking group, v is 1, and $R_2$ can be selected from the group consisting of moieties conforming to the structure of one of Formulae (AA)-(AG) below. The structure of Formula (AA) is

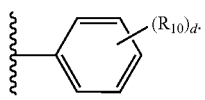
(AA)

In the structure of Formula (AA), the variable d is zero or a positive integer from 1 to 5, and each $R_{10}$ is independently selected from the group consisting of halogens, alkyl groups, substituted alkyl groups, alkoxy groups, substituted alkoxy groups, aryl groups, and substituted aryl groups. The structure of Formula (AB) is

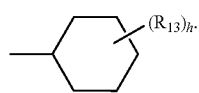
(AB)

In the structure of Formula (AB), the variable h is zero or a positive integer from 1 to 10, and each $R_{13}$ is independently selected from the group consisting of halogens, alkyl groups, substituted alkyl groups, alkoxy groups, substituted alkoxy groups, aryl groups, and substituted aryl groups. The structure of Formula (AC) is

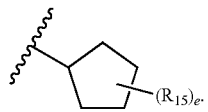
(AC)

In the structure of Formula (AC), the variable e is zero or a positive integer from 1 to 8, and each $R_{15}$ is independently selected from the group consisting of halogens, alkyl groups, substituted alkyl groups, alkoxy groups, substituted alkoxy groups, aryl groups, and substituted aryl groups. The structure of Formula (AD) is

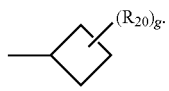
(AD)

In the structure of Formula (AD), the variable g is zero or a positive integer from 1 to 6, and each $R_{20}$ is independently selected from the group consisting of halogens, alkyl groups, substituted alkyl groups, alkoxy groups, substituted alkoxy groups, aryl groups, and substituted aryl groups. The structure of Formula (AE) is

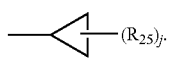
(AE)

In the structure of Formula (AE), the variable j is zero or a positive integer from 1 to 4, and each $R_{25}$ is independently selected from the group consisting of halogens, alkyl groups, substituted alkyl groups, alkoxy groups, substituted alkoxy groups, aryl groups, and substituted aryl groups. The structure of Formula (AF) is

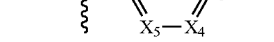
(AF)

In the structure of Formula (AF), the variables $X_1$, $X_2$, $X_3$, $X_4$, and $X_5$ are independently selected from the group consisting of a carbon atom and a nitrogen atom, provided at least one and no more than three of $X_1$, $X_2$, $X_3$, $X_4$, and $X_5$ are nitrogen atoms; t is zero or a positive integer equal to 5–X where X is the number of nitrogen atoms; and each $R_{27}$ is independently selected from the group consisting of halogens, alkyl groups, substituted alkyl groups, alkoxy groups, substituted alkoxy groups, aryl groups, and substituted aryl groups. The structure of Formula (AG) is

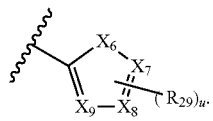
(AG)

In the structure of Formula (AG), the variable $X_6$ is selected from the group consisting of a carbon atom, an oxygen atom, a sulfur atom, and a secondary amine group, $X_7$, $X_8$, and $X_9$ are independently selected from the group consisting of a carbon atom and a nitrogen atom, at least one and no more than three of $X_6$, $X_7$, $X_8$, and $X_9$ are non-carbon atoms; u is zero or a positive integer equal to 4−Y where Y is the number of non-carbon atoms in the ring structure; and each $R_{29}$ is independently selected from the group consisting of halogens, cyano groups, alkyl groups, substituted alkyl groups, alkoxy groups, substituted alkoxy groups, aryl groups, and substituted aryl groups.

When L is a trivalent linking group, v is 1, and $R_2$ can be selected from the group consisting of moieties conforming to the structure of one of Formula (AH)-(AJ) below. The structure of Formula (AH) is

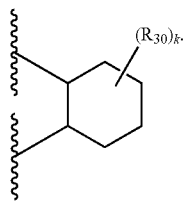

(AH)

In the structure of Formula (AH), the variable k is zero or a positive integer from 1 to 8, and each $R_{30}$ is independently selected from the group consisting of halogens, alkyl groups, substituted alkyl groups, alkoxy groups, substituted alkoxy groups, aryl groups, and substituted aryl groups. The structure of Formula (AI) is

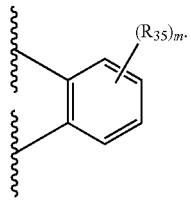

(AI)

In the structure of Formula (AI), the variable m is zero or a positive integer from 1 to 4, and each $R_{35}$ is independently selected from the group consisting of halogens, alkyl groups, substituted alkyl groups, alkoxy groups, substituted alkoxy groups, aryl groups, and substituted aryl groups. The structure of Formula (AJ) is

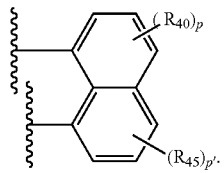

(AJ)

In the structure of Formula (AJ), the variable p is zero or a positive integer from 1 to 3, p' is zero or a positive integer from 1 to 3, and each $R_{40}$ and $R_{45}$ is independently selected from the group consisting of halogens, alkyl groups, substituted alkyl groups, alkoxy groups, substituted alkoxy groups, aryl groups, and substituted aryl groups.

When L is a divalent liking group, v is 2, and $R_2$ can selected from the group consisting of moieties conforming to the structure of Formula (BA) below

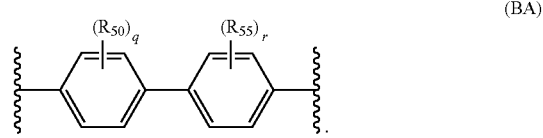

(BA)

In the structure of Formula (BA), the variable q is zero or a positive integer from 1 to 4, r is zero or a positive integer from 1 to 4, and each $R_{50}$ and $R_{55}$ is independently selected from the group consisting of halogens, alkyl groups, substituted alkyl groups, alkoxy groups, substituted alkoxy groups, aryl groups, and substituted aryl groups.

When L is a divalent linking group, v is 3, and $R_2$ can be selected from the group consisting of moieties conforming to the structure of Formula (CA) below

(CA)

In the structure of Formula (CA), the variable s is zero or a positive integer from 1 to 3, and each $R_{60}$ is independently selected from the group consisting of halogens, alkyl groups, substituted alkyl groups, alkoxy groups, substituted alkoxy groups, aryl groups, and substituted aryl groups.

In a series of preferred embodiments, L is a divalent linking group, v is 1, and $R_2$ is a moiety conforming to the structure of Formula (AA). Within this series of preferred embodiments, the variable d preferably is zero or 1. If d is 1, the group $R_{10}$ preferably is attached to the aryl ring in the para position relative to the bond to the linking group L. Further if d is 1, the group $R_{10}$ preferably is a halogen (e.g., bromine), an alkoxy group (e.g., a methoxy group), or an aryl group (e.g., a phenyl group).

In a series of preferred embodiments, L is a divalent linking group, v is 1, and $R_2$ is a moiety conforming to the structure of Formula (AC). Within this series of preferred embodiments, the variable d preferably is zero or 1, with zero being particularly preferred.

As noted above, $M_1$ is a metal cation. Suitable metal cations include, but are not limited to, alkali metal cations (e.g., sodium), alkaline earth metal cations (e.g., calcium), transition metal cations (e.g., zinc), and group 13 metal cations (e.g., aluminum). As utilized herein, the term "transition metal" is used to refer those elements in the d-block of the periodic table of elements, which corresponds to groups 3 to 12 on the periodic table of elements. In a preferred embodiment, $M_1$ is a metal cation selected from the group consisting of lithium, sodium, magnesium, aluminum, potassium, calcium, and zinc. In another preferred embodiment, $M_1$ is a lithium cation. In those embodiments in which the compound contains more than one metal cation $M_1$, each $M_1$ can be the same or different.

In another preferred embodiment, the nucleating agent comprises a compound conforming to the structure of Formula (CX)

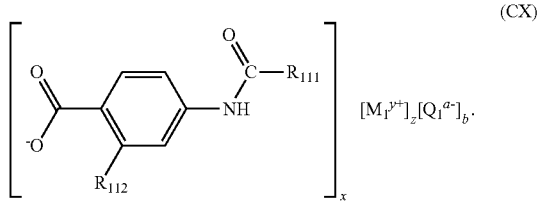

(CX)

In the structure of (CX), $R_{111}$ is selected from the group consisting of a cyclopentyl group and moieties conforming to the structure of Formula (CXI); and $R_{112}$ is selected from the group consisting of hydrogen and hydroxy. The structure of Formula (CXI) is

(CXI)

In the structure of (CXI), $R_{115}$ is selected from the group consisting of hydrogen, a halogen, methoxy, and phenyl. The variable x is a positive integer; each $M_1$ is a metal cation; y is the valence of the cation; and z is a positive integer. The variable b is zero or a positive integer. When b is a positive integer, each $Q_1$ is a negatively-charged counterion, and a is the valence of the negatively-charged counterion. The values of x, y, z, a, and b satisfy the equation x+(ab)=yz. Further, if $R_{115}$ is hydrogen, then $R_{112}$ is hydrogen, x is 1, $M_1$ is a lithium cation, y is 1, z is 1, and b is zero. Also, if $R_{115}$ is a methoxy group, then $R_{112}$ is a hydroxy group.

$M_1$ can be any of the cations described above as being suitable for the compound conforming to the structure of Formula (I), including those cations noted as being preferred for the structure of Formula (I). In a preferred embodiment, $M_1$ is a cation of a metal selected from the group consisting of alkali metals and alkaline earth metals. In another preferred embodiment, $M_1$ is a cation of a metal selected from the group consisting of alkali metals. In a preferred embodiment, $M_1$ is a lithium cation. $Q_1$, if present, can be any of the anions described above as being suitable for the compound conforming to the structure of Formula (I), including those anions noted as being preferred for the structure of Formula (I).

In a preferred embodiment, $R_{111}$ is a cyclopentyl group. The cyclopentyl group can be unsubstituted or substituted. The substituted cyclopentyl group can conform to the structure of Formula (AC) above. Preferably, the cyclopentyl group is unsubstituted. In a more specific embodiment, $R_{111}$ is a cyclopentyl group, the variable x is 1, $M_1$ is a lithium cation, y is 1, z is 1, and b is zero.

In another preferred embodiment, $R_{111}$ is a moiety conforming to the structure of Formula (CXI). In a more specific embodiment, $R_{111}$ is a moiety conforming to the structure of Formula (CXI), and $R_{115}$ is hydrogen. In another more specific embodiment, $R_{111}$ is a moiety conforming to the structure of Formula (CXI), and $R_{115}$ is a methoxy group. In yet another specific embodiment, $R_{111}$ is a moiety conforming to the structure of Formula (CXI), $R_{115}$ is a methoxy group, x is 1, $M_1$ is a lithium cation, y is 1, z is 1, and b is zero. In another more specific embodiment, $R_{111}$ is a moiety conforming to the structure of Formula (CXI), and $R_{115}$ is a halogen, preferably chlorine. In a yet more specific embodiment, $R_{111}$ is a moiety conforming to the structure of Formula (CXI), $R_{115}$ is a halogen, preferably chlorine, and $R_{112}$ is hydrogen. In another more specific embodiment, $R_{111}$ is a moiety conforming to the structure of Formula (CXI), $R_{115}$ is chlorine, $R_{112}$ is hydrogen, and $M_1$ a cation of a metal selected from the group consisting of alkali metals, preferably sodium. In a more specific embodiment, $R_{111}$ is a moiety conforming to the structure of Formula (CXI), $R_{115}$ is chlorine, $R_{112}$ is hydrogen, x is 1, $M_1$ a sodium cation, y is 1, z is 1, and b is zero.

The nucleating agent can be present in the polyethylene polymer in any suitable amount. The nucleating agent can be present in the polyethylene polymer in an amount of about 50 parts per million (ppm) or more, about 100 ppm or more, about 250 ppm or more, or about 500 ppm or more, based on the total weight of the polyethylene polymer. The nucleating agent typically is present in the polyethylene polymer in an amount of about 10,000 ppm or less, about 7,500 ppm or less, about 5,000 ppm or less, about 4,000 ppm or less, or about 3,000 ppm or less, based on the total weight of the polyethylene polymer. Thus, in certain embodiments of the polyethylene article, the nucleating agent is present in the polyethylene polymer in an amount of about 50 to about 10,000 ppm, about 100 to about 7,500 ppm (e.g., about 100 to about 5,000 ppm), about 250 to about 5,000 ppm (e.g., about 250 to about 4,000 ppm or about 250 to about 3,000 ppm), or about 500 to about 5,000 ppm (e.g., about 500 to about 4,000 ppm or about 500 to about 3,000 ppm), based on the total weight of the polyethylene polymer.

The nucleating agent, including the metal salt compounds of Formula (I), can be produced in various particle shapes and sizes. In general, these salt compounds form layered crystalline structures wherein the metal ions are present in galleries which are sandwiched between alternating layers of organic surfaces. As a result, flat platelet-like particles are often produced wherein the nucleating surfaces are exposed on the top and bottom of the particles, rather than the edges. The aspect ratio of these platelet-like particles is typically defined as the diameter, or breadth, versus the thickness. Elongated platelets, or "lath-like" crystals, are another particle morphology possible with these metal salt compounds. In these elongated structures, the aspect ratio typically is defined as the ratio of the length to the width. Aspect ratios of 2:1 up through 50:1 are possible. Particles with aspect ratios can align in molten polymer flow fields such that the flat surfaces are parallel to the machine, or flow, direction and parallel to the transverse, or cross, direction. As a result, the nucleating surfaces are exposed only in the normal direction of the polymer melt during part fabrication (exceptions would result when platelet-shaped particles possessed an aspect ratio insufficient for flat registry, and tumbling in the polymer flow direction results). Preferred particle orientations, or "registry", combined with specific crystallographic interactions with polyethylene during the nucleation event, can create directed lamellar growth which can result in unique and beneficial orientations of polyethylene crystals within the articles produced.

The particles of the nucleating agent discussed above can have any suitable size. Preferably, the particles of the nucleating agent are small enough that they are not visible in a finished article made from the thermoplastic polymer composition. Thus, in a preferred embodiment, the particles of the nucleating agent preferably are less than 25 microns in diameter, more preferably less than 20 microns in diameter, and most preferably less than 15 microns in diameter.

While not wishing to be bound to any particular theory, it is believed that the nucleating agent described above can produce the desired b-axis orientation of the polyethylene by one of two possible mechanisms. In the first mechanism, the nucleating agent is a crystalline solid, and the crystals of the nucleating agent have a surface topology consisting of atoms with specific spacing in two dimensions. The spacing of these atoms at the nucleating surface of the nucleating agent is such that at least one positive integer multiple of the spacing is within 15%, preferably 5%, of at least one positive integer multiple of the b-axis length of the orthorhombic polyethylene unit cell (0.493 nm). Further, in this first mechanism, the particles of the nucleating agent become aligned in the polymer flow in such a way that the nucleating surface of the nucleating agent is in the machine direction-transverse direction plane, and the d-spacing direction in the nucleating agent crystal is within 45° of the machine direction. When the nucleating agent exhibits these properties and becomes aligned in the polymer in this manner, it is believed that the polyethylene will crystallize with the b-axis preferentially aligned in the machine direction, as described above.

In the second mechanism, the nucleating agent is a crystalline solid, and the crystals of the nucleating agent have a surface topology consisting of atoms with a specific spacing in two dimensions. The spacing of the atoms at the nucleating surface of the nucleating agent is such that at least one positive integer multiple of the spacing is within 15%, preferably 5%, of at least one positive integer multiple of (i) the a-axis length of the orthorhombic polyethylene unit cell (0.74 nm) or (ii) the interchain distance of the polyethylene 110 plane (0.445 nm). Further, in this second mechanism, the particles of the nucleating agent exhibit a "small coin" morphology (i.e., plate-like particles in which the major surfaces have substantially the same length and width, such as roughly round or square), and the particles become aligned in the polymer flow such that the "flat coin surface" of the particles (i.e., the major surfaces of the plate-like particles) is aligned perpendicular to the flow direction. When the nucleating agent exhibits these properties, and is of such a small particle size to allow tumbling in the flow direction of the molten polyethylene, it is believed that the polyethylene will crystallize with the b-axis preferentially aligned in the machine direction, as described above.

The polyethylene article can contain other polymer additives in addition to the aforementioned nucleating agent. Suitable additional polymer additives include, but are not limited to, antioxidants (e.g., phenolic antioxidants, phosphite antioxidants, and combinations thereof), anti-blocking agents (e.g., amorphous silica and diatomaceous earth), pigments (e.g., organic pigments and inorganic pigments) and other colorants (e.g., dyes and polymeric colorants), fillers and reinforcing agents (e.g., glass, glass fibers, talc, calcium carbonate, and magnesium oxysulfate whiskers), nucleating agents, clarifying agents, acid scavengers (e.g., metal salts of fatty acids, such as the metal salts of stearic acid, and dihydrotalcite), polymer processing additives (e.g., fluoropolymer polymer processing additives), polymer cross-linking agents, slip agents (e.g., fatty acid amide compounds derived from the reaction between a fatty acid and ammonia or an amine-containing compound), fatty acid ester compounds (e.g., fatty acid ester compounds derived from the reaction between a fatty acid and a hydroxyl-containing compound, such as glycerol, diglycerol, and combinations thereof), and combinations of the foregoing.

As noted above, the polyethylene article of the invention can contain other nucleating agents in addition to those compounds conforming to the structure of Formula (I). Suitable nucleating agents include, but are not limited to, 2,2'-methylene-bis-(4,6-di-tert-butylphenyl)phosphate salts (e.g., sodium 2,2'-methylene-bis-(4,6-di-tert-butylphenyl) phosphate or aluminum 2,2'-methylene-bis-(4,6-di-tert-butylphenyl)phosphate), bicyclo[2.2.1]heptane-2,3-dicarboxylate salts (e.g., disodium bicyclo[2.2.1]heptane-2,3-dicarboxylate or calcium bicyclo[2.2.1]heptane-2,3-dicarboxylate), cyclohexane-1,2-dicarboxylate salts (e.g., calcium cyclohexane-1,2-dicarboxylate, monobasic aluminum cyclohexane-1,2-dicarboxylate, dilithium cyclohexane-1,2-dicarboxylate, or strontium cyclohexane-1,2-dicarboxylate), glycerolate salts (e.g., zinc glycerolate), phthalate salts (e.g., calcium phthalate), phenylphosphonic acid salts (e.g., calcium phenylphosphonate), and combinations thereof. For the bicyclo[2.2.1]heptane-2,3-dicarboxylate salts and the cyclohexane-1,2-dicarboxylate salts, the carboxylate moieties can be arranged in either the cis- or trans-configuration, with the cis-configuration being preferred.

As noted above, the polyethylene article of the invention can also contain a clarifying agent. Suitable clarifying agents include, but are not limited to, trisamides and acetal compounds that are the condensation product of a polyhydric alcohol and an aromatic aldehyde. Suitable trisamide clarifying agents include, but are not limited to, amide derivatives of benzene-1,3,5-tricarboxylic acid, derivatives of N-(3,5-bis-formylamino-phenyl)-formamide (e.g., N-[3, 5-bis-(2,2-dimethyl-propionylamino)-phenyl]-2,2-dimethyl-propionamide), derivatives of 2-carbamoyl-malonamide (e.g., N,N'-bis-(2-methyl-cyclohexyl)-2-(2-methyl-cyclohexylcarbamoyl)-malonamide), and combinations thereof. As noted above, the clarifying agent can be an acetal compound that is the condensation product of a polyhydric alcohol and an aromatic aldehyde. Suitable polyhydric alcohols include acyclic polyols such as xylitol and sorbitol, as well as acyclic deoxy polyols (e.g., 1,2,3-trideoxynonitol or 1,2,3-trideoxynon-1-enitol). Suitable aromatic aldehydes typically contain a single aldehyde group with the remaining positions on the aromatic ring being either unsubstituted or substituted. Accordingly, suitable aromatic aldehydes include benzaldehyde and substituted benzaldehydes (e.g., 3,4-dimethyl-benzaldehyde or 4-propyl-benzaldehyde). The acetal compound produced by the aforementioned reaction can be a mono-acetal, di-acetal, or tri-acetal compound (i.e., a compound containing one, two, or three acetal groups, respectively), with the di-acetal compounds being preferred. Suitable acetal-based clarifying agents include, but are not limited to, the clarifying agents disclosed in U.S. Pat. Nos. 5,049,605; 7,157,510; and 7,262,236.

In one particular embodiment, the invention provides a polyethylene article comprising a nucleating agent as described above and an acid scavenger compound. The nucleating agent present in the article can be any one or more of the nucleating agent compounds described above, such as a compound conforming to the structure of Formula (I), a compound conforming to the structure of Formula (C), a compound conforming to the structure of Formula (CX), a compound conforming to the structure of Formula (CXX), or any suitable mixture of such compounds. Preferably, the nucleating agent in the article is selected from the group consisting of compounds conforming to the structure of Formula (CX). More preferably, the nucleating agent is a compound conforming to the structure of Formula (CX) in which $R_{112}$ is hydrogen, $R_{111}$ is a moiety conforming to the structure of Formula (CXI), and $R_{115}$ is a halogen. In a more specific preferred embodiment, the nucleating agent is a compound conforming to the structure of Formula (CX) in which $R_{112}$ is hydrogen, $R_{111}$ is a moiety conforming to the structure of Formula (CXI), $R_{115}$ is chlorine, $M_1$ is a sodium cation, x is 1, y is 1, z is 1, and b is 0.

In this embodiment of the polyethylene article comprising the nucleating agent and an acid scavenger, the acid scavenger preferably is selected from the group consisting of metal salts of fatty acids and synthetic hydrotalcite compounds. Suitable metal salts of fatty acids include, but are not limited to, the metal salts of $C_{12}$-$C_{22}$ fatty acids, such as stearic acid. In a preferred embodiment, the acid scavenger is selected from the group consisting of the zinc, potassium, and lanthanum salts of stearic acid. Suitable synthetic hydrotalcite compounds include, but are not limited to, DHT-4A acid scavenger sold by Kyowa Chemical Industry Co., Ltd.

The nucleating agent and the acid scavenger can be present in the article in any suitable amounts. For example, the nucleating agent and the acid scavenger can be present in the article in a ratio (nucleating agent to acid scavenger) of about 10:1 to about 1:10 based on the weight of the nucleating agent and the acid scavenger in the article. More preferably, the nucleating agent and the acid scavenger are present in the article in a ratio (nucleating agent to acid scavenger) of about 4:1 to about 1:4, about 3:1 to about 1:3, about 1:1 to about 1:4, or about 1:1 to about 1:3 based on the weight of the nucleating agent and the acid scavenger in the article.

Surprisingly, it has been found that the nucleating agent and the acid scavenger synergistically interact when both are added to a thermoplastic polymer, such as a polyethylene polymer. In particular, it has been found that the addition of the acid scavenger can improve the performance of the nucleating agent. For example, the addition of both the nucleating agent and the acid scavenger can improve the physical property enhancements to the polymer beyond those realized when the nucleating agent alone is used. Also, the addition of the acid scavenger can permit one to achieve a desired level of physical property enhancements to the polymer using less nucleating agent than would be required if the nucleating agent were added alone. This synergy is considered especially surprising given the fact that the acid scavenger has not been observed to nucleate the polymer itself. For example, the addition of the acid scavenger alone does not have an appreciable effect on the physical properties of the polymer.

In the polyethylene articles, the addition of the nucleating agent and acid scavenger described above has been observed to significantly lower the machine direction shrinkage, which is indicative of increased machine direction orientation of the crystalline lamellae, and significantly improve the stiffness and heat deflection temperature of the polymer.

The polyethylene article of the invention can be made by any suitable technique, such as injection molding (e.g., thin-wall injection molding, multicomponent molding, overmolding, or 2K molding), injection rotational molding, blow molding (e.g., extrusion blow molding, injection blow molding, or injection stretch blow molding), extrusion (e.g., profile extrusion, fiber extrusion, tape (e.g., slit tape) extrusion, sheet extrusion, film extrusion, cast film extrusion, pipe extrusion, extrusion coating, or foam extrusion), thermoforming, rotomolding, film blowing (blown film), film casting (cast film), compression molding, extrusion compression molding, extrusion compression blow molding, and the like. Preferably, the polyethylene article of the invention is made by extrusion (e.g. Fiber extrusion, tape extrusion, sheet extrusion, film extrusion, cast film extrusion, pipe extrusion, extrusion coating, or profile extrusion), film blowing (blown film), film casting (cast film), injection molding (e.g., thin-wall injection molding, multicomponent molding, overmolding, or 2K molding), and extrusion blow molding. The polyethylene article of the invention can be a single layer in a multilayer article, such as a multilayer blown or cast film or a multilayer injection molded article. In such an embodiment, the layer corresponding to the article of the invention will exhibit the above-described b-axis orientation, while the other layers may exhibit different orientations of the crystalline polyethylene. In such multilayer articles, all of the layers can exhibit the above-described b-axis orientation, in which case each individual layer of the article can be considered an article according to the invention or the entire multilayer structure can be considered an article according to the invention.

The polyethylene article of the invention can be any suitable article of manufacture. Suitable articles of manufacture include, but are not limited to, medical devices (e.g., pre-filled syringes for retort applications, intravenous supply containers, and blood collection apparatus), food packaging, liquid containers (e.g., containers for drinks, medications, personal care compositions, shampoos, and the like), apparel cases, microwavable articles, shelving, cabinet doors, mechanical parts, automobile parts, sheets, pipes, tubes, rotationally molded parts, blow molded parts, films, fibers, and the like.

When a nucleating agent is used to produce the article of the invention, the physical property effects of the nucleating agent on the polymer can be improved by manipulating the characteristic process time (T) and/or selecting a polymer exhibiting an appropriate average relaxation time ($\lambda$). In this context, the characteristic process time (T) is the time during which the molten polymer is subjected to strain, which results in stress (e.g., extensional melt stress) in the polymer melt. The average relaxation time ($\lambda$) is a characteristic of the polymer and is a measure of the time it takes the polymer melt to relieve stress. The average relaxation time ($\lambda$) is dependent upon, inter alia, the molecular weight of the polymer, the molecular weight distribution of the polymer, and the degree of branching in the polymer. For example, it is known that $\lambda$ is proportional to the molecular weight of the polymer, with higher molecular weights leading to longer relaxation times. Further, most commercial polyolefins are more or less polydisperse, with the degree of polydispersity typically indicated by Mw/Mn as determined by GPC. This polydispersity inherently yields a series of molecular weight-dependent relaxation times, though many techniques can only measure a single average relaxation time for such polydisperse systems. The polydispersity of the polymer, and the series of molecular weight-dependent relaxation times and/or average relaxation time, can be intentionally further broadened or manipulated by making bimodal blends, as described above.

Many thermoplastic polymers, such as polyethylene, crystallize by chain folding, producing crystalline lamellae interspersed with an amorphous phase. In processes in which the molten polymer is subject to relatively little strain, the polymer chains in the polymer melt are not well aligned and the polymer melt (e.g., polyethylene melt) cools until sufficient chain alignment occurs to spontaneously initiate crystalline lamellae growth. When this spontaneous lamellae growth occurs, the nucleation density is relatively low, and the growing lamellae travel further before impinging on each other. This allows the lamellae to begin to change their direction or splay out, with the extreme of splaying being the formation of full spherulites. Because of the relatively long time it takes for self-nucleation to occur under these conditions, a nucleating agent (such as that described in this application) added to the polymer melt will have the opportunity to control a larger proportion of the lamellae growth. And with a larger proportion of the lamellae being formed by the nucleating agent, the nucleating agent will effectively influence the physical properties of the polymer and article.

Certain processes, such as film blowing, can impart significant extensional strain to the polymer melt in the machine direction (i.e., the direction in which the molten polymer exits the die). The resulting stress causes polymer chains to uncoil from their entropic random coil, resulting in extended polymer chain alignments in the machine direction. If this orientation persists as the polymer melt cools, some of these aligned, extended chain segments can crystallize from the melt to form relatively long fibrils. The fibrils are very effective in nucleating chain-folding lamellae growth. The lamellae form and begin to grow perpendicular to the fibril axis and more or less radially around the fibrils. Since the nucleation density is higher, growing lamellae may impinge on each other before significant splaying begins. This process is referred to herein as "stress-induced fibril self-nucleation." Under certain conditions as described below, this stress-induced fibril self-nucleation can become prominent in the polymer (e.g., a polyethylene polymer). Thus, any heterogeneous nucleating agent must compete with this stress-induced fibril self-nucleation, making the nucleating agent less effective at favorably influencing the physical properties of the polymer and the article. The effects of $\lambda$ and $T$ on stress-induced fibril self-nucleation and the effectiveness of nucleating agents are described below.

Assuming a constant $T$, a shorter $\lambda$ means that more stress relaxation occurs and less polymer chain orientation (e.g., polymer chain orientation induced by the extensional strain on the polymer melt) remains at the end of $T$. Under such conditions, stress-induced fibril self-nucleation will be less prominent in the polymer, and a nucleating agent will be more effective at controlling lamellae growth and influencing the physical properties of the polymer and the article. At the same $T$, a longer $\lambda$ means that less stress relaxation occurs and more polymer chain orientation remains at the end of $T$. Under this set of conditions, stress-induced fibril self-nucleation will be more prominent in the polymer, and a nucleating agent will be less effective at controlling lamellae growth and influencing the physical properties of the polymer and the article.

In assessing the effects of $\lambda$ and $T$ on stress-induced fibril self-nucleation and the effectiveness of heterogeneous nucleating agents (such as those described herein) in, for example, blown film processes, it can be instructive to consider the ratio of $\lambda$ to $T$ ($\lambda/T$), which will be referred to hereinafter as the "Fabrication Time Ratio" (FTR). The FTR is of the same form as and roughly analogous to the Deborah number (De). As illustrated by the foregoing discussion, a lower FTR means that less stress-induced fibril self-nucleation will occur in the polymer, making a nucleating agent more effective at influencing the physical properties. And a higher FTR means that more stress-induced fibril self-nucleation will occur in the polymer, making a nucleating agent less effective at influencing the physical properties. Since the process times of most commercial processes can only be varied within a relatively narrow window, the more viable option for changing the FTR to improve or optimize the effect of the nucleating agent is to change $\lambda$, which is done by varying the polymer properties. More specifically, for a given process, the effect of the nucleating agent can be optimized to achieve the desired result by varying the polymer properties and $\lambda$ to better match the process time $T$.

Thus, if one is unable to achieve the desired degree of nucleation effects (e.g., improved barrier properties or increased tear strength) using a given nucleating agent and polymer in a process, one can improve the results by selecting a different polymer having a shorter $\lambda$. For example, one can select a bimodal polymer containing a first fraction having a relatively low Melt Index (which is typically indicative of a higher molecular weight and therefore a longer $\lambda$) and a second fraction having a relatively high Melt Index (which is typically indicative of a lower molecular weight and therefore a shorter $\lambda$). In this system, the higher Melt Index fraction may provide a $\lambda$ for the entire polymer that results in less stress-induced fibril self-nucleation and improved response to the heterogeneous nucleating agent. Alternatively, the nucleating agent may only nucleate the higher Melt Index fraction (due to the shorter $\lambda$ exhibited by the fraction), leaving the lower Melt Index fraction to undergo stress-induced fibril self-nucleation in basically the same manner as if no nucleating agent were present. Regardless of the mechanism at work, the end result is that the nucleating agent controls more lamellae growth in the polymer and exerts an increased influence on the physical properties of the polymer. While the foregoing example describes the use of bimodal polymers, the same effects can be achieved using multimodal polymers and physical blends of distinct polymers because each of these alternatives also provides a means to reduce $\lambda$. Further, similar improvements can be achieved by selecting a polymer having a narrower molecular weight distribution (as indicated by a lower melt flow ratio). A narrower molecular weight distribution typically indicates the absence of a higher molecular weight "tail" or fraction in the polymer that might increase $\lambda$ for the polymer. Also, similar improvements can be achieved by selecting a polymer having less long chain branching, since long chain branching can result in melt entanglement that can increase $\lambda$.

The following examples further illustrate the subject matter described above but, of course, should not be construed as in any way limiting the scope thereof.

EXAMPLE 1

This example demonstrates the fabrication of a polyethylene article according to the invention by injection molding. A polymer composition (Sample 1) was prepared by compounding 2000 ppm of sodium 4-chlorophenylamidobenzoate into a commercially available high density polyethylene (LYB HOSTALEN ACP 6541 AUV) having a density of approximately 0.954 g/cm$^3$ and a melt flow index of approximately 1.45 dg/minute. The resin was first ground to a 35 mesh powder, high intensity mixed with the additives, and then compounded and extruded to form pellets. The formed polymer composition pellet was then injection molded into rectangular bars having dimensions of 127 mm×12.7 mm×3.2 mm on an Airburg 40 Ton injection-molding machine and a two cavity mold. The injection-molding temperature was 220° C. and the injection rate was 40 cm$^3$/s, which gave an injection time of 0.81 sec.

Another set of injection molded bars was produced using the same high density polyethylene polymer without the nucleating agent (Comparative Sample 1).

Flexural modulus testing (reported as 1% secant modulus) was performed on the above-described bars using a MTS Qtest/5 instrument, according to ASTM D790 procedure B. The heat deflection temperature (HDT) of the bars was determined using a Ceast HDT 3 VICAT instrument, according to ASTM D648-07 method B. Izod impact testing was performed on the bars using a Tinius-Olsen 892T instrument, according to ASTM D256, method A.

The peak polymer recrystallization temperature ($T_c$) for the polyethylene polymer was measured using a differential scanning calorimeter (Mettler-Toledo DSC822 differential scanning calorimeter). In particular, a sample was taken from the target part and heated at a rate of 20° C./minute from a temperature of 60° C. to 220° C., held at 220° C. for two minutes, and cooled at a rate of approximately 10° C./minute to a temperature of 60° C. The temperature at which peak polymer crystal reformation occurred (which corresponds to the peak polymer recrystallization temperature) was recorded for each sample.

For wide angle x-ray diffraction pole figure analysis, a rectangular strip, having dimensions of 3 mm×3 mm×35 mm, was made by cutting the injection-molded bars with the length along the machine direction (MD) of the bars. Pole figure data were obtained using D8 discover equipped with GADDS transmission detector and operated with Cu Kα radiation (0.1542 nm). The data were collected at a fixed 2theta-range while rotating the sample orientation (2θ~24° for the (200) diffraction and 2θ~36° for the (020) diffraction. The resulting data was then analyzed using the GADDS software supplied by the manufacturer (Bruker AXS Inc).

Table 1 shows the Herman's orientation indices of the b-axis in the machine direction (MD), transverse direction (TD), and the normal direction (ND) for the bars made from Sample 1 and Comparative Sample 1. Table 2 shows various properties of Sample 1 and Comparative Sample 1.

TABLE 1

Herman's orientation indices of Sample 1 and Comparative Sample 1.

| Herman's orientation index | Sample 1 | Comparative Sample 1 |
| --- | --- | --- |
| F(MD, 020) | 0.19 | −0.10 |
| F(TD, 020) | 0.02 | 0.05 |
| F(ND, 020) | −0.21 | 0.04 |

TABLE 2

Various properties of Sample 1 and Comparative Sample 1 (C.S. 1).

| Sample | $T_c$ (° C.) | Secant Modulus (Mpa) | StdDev (Mpa) | HDT (° C.) |
| --- | --- | --- | --- | --- |
| 1 | 118.5 | 1061 | 4 | 80 |
| C. S. 1 | 117.0 | 923 | 13 | 61 |

As can be seen from the data set forth in Tables 1 and 2, the article of the invention (bar made with Sample 1) exhibited preferential alignment of the b-axes of the polyethylene crystals in the machine direction of the article. The comparative article (bar made with Comparative Sample 1) exhibited rather random orientation with slightly preferential alignment of the b-axes in the transverse and normal directions of the article. The articles of the invention also exhibited improvements in several physical properties, such as modulus and heat deflection temperature.

EXAMPLE 2

This example demonstrates the fabrication of a polyethylene article according to the invention. A polymer composition (Sample 2) was prepared by compounding 2000 ppm of milled sodium 4-chlorophenylamido-benzoate into a commercially-available, high density polyethylene polymer (Sclair® 19G from Nova Chemicals) having a density of approximately 0.962 g/cm$^3$ and a melt flow index of approximately 1.2 dg/minute. The polyethylene resin used was first ground to about 35 mesh and then the additive was added to the resin and blended in a Henschel high intensity mixer for about 2 minutes with a blade speed of about 2100 rpm. The sample was then melt compounded in a MPM single screw extruder, with a 38 mm diameter screw. The barrel temperature of the extruder was ramped from 160 to 190° C. The extrudate in the form of strands was cooled in a water bath and then subsequently pelletized.

The formed polymer composition pellet was then used to produce blown films (3 mil thickness) in a blown film line with a Future Design air ring using the following setup: 101.6 mm (4 in) die, 2.0 mm die gap, BUR 2.3, DDR 11.4, and output 30 kg/h. The Herman's orientation indices, recrystallization peak temperature, tear strength, dart drop impact, 1% secant modulus, and permeation of the resulting films were measured and are reported in Tables 3, 4 and 5.

As to the film samples for pole-figure analysis, layers of films are carefully stacked to enhance diffraction intensity. Then a stack was made by cutting a long rectangular strip with the dimension of about 3×3×30 mm$^3$, length along MD, and spraying adhesive, Scotch glue, on the film. Pole figure data were obtained using D8 discover equipped with GADDS transmission detector and operated with Cu Kα radiation (0.1542 nm). The data were collected at a fixed 2theta-range while rotating the sample orientation (2θ~24° for the (200) diffraction and 2θ~36° for the (020) diffraction) and were analyzed using the GADDS software supplied by the manufacturer (Bruker AXS Inc).

Permeation, measured as water vapor transmission rate, was measured using an Illinois Instruments 7000 Water Vapor Permeation Analyzer, according to ASTM E398. Tear strength was measured using a ProTear Tear Tester equipment according to ASTM D1922. Dart drop impact testing was performed using a Dynisco Model D2085AB-P dart drop polymer tester, according to ASTM D1709. Film tensile test was performed using a MTS Q-Test-5 instrument, according to ASTM D882.

The peak polymer recrystallization temperature (Tc) for the thermoplastic polymer compositions was measured using a differential scanning calorimeter (Mettler-Toledo DSC822 differential scanning calorimeter). In particular, a compression molded plaque was prepared from the pellets and a sample was taken from the plaque and heated at a rate of 20° C./minute from a temperature of 60° C. to 220° C., held at 220° C. for two minutes, and cooled at a rate of approximately 10° C./minute to a temperature of 60° C. The temperature at which peak polymer crystal reformation occurred (which corresponds to the peak polymer recrystallization temperature) was recorded for each sample.

Another set of blown film was produced using the same high density polyethylene polymer without the nucleating agent (Comparative Sample 2).

TABLE 3

Herman's orientation indices of Sample 2 and Comparative Sample 2.

| Herman's orientation index | Sample 2 | Comparative Sample 2 |
|---|---|---|
| F(MD, 020) | 0.21 | −0.36 |
| F(TD, 020) | 0.06 | 0.28 |
| F(ND, 020) | −0.27 | 0.08 |

TABLE 4

Crystalline temperature (Tc), tear resistance, and impact data of Sample 2 and Comparative Sample 2.

| Sample | Crystalline temperature (° C.) | TEAR MD Tear (g) | Std Dev | TD Tear (g) | Std Dev | Impact (g) |
|---|---|---|---|---|---|---|
| 2 | 118.8 | 78 | 5 | 85 | 2 | 94 |
| C. S 2 | 115.2 | 60 | 3 | 168 | 4 | 95 |

TABLE 5

1% secant modulus and normalized transmission rate data of Sample 2 and Comparative Sample 2.

| Sample | 1% secant Modulus MD (MPa) | Std Dev | TD (MPa) | Std Dev | Normalized Transmission Rate (g · mil/m² · day) |
|---|---|---|---|---|---|
| 2 | 684 | 58 | 616 | 48 | 1.7 |
| C. S. 2 | 583 | 19 | 704 | 42 | 3.9 |

From the tables, the article of the invention (film made with Sample 2) exhibited preferential alignment of the b-axes of the polyethylene crystals in the machine direction of the article. The comparative article (film made with Comparative Sample 1) exhibited preferential alignment of the b-axes in the transverse and normal directions of the article. The articles of the invention also exhibited improvements in several physical properties, such as balanced MD-TD tear profile, higher MD modulus, and less permeation rate.

EXAMPLE 3

This example demonstrates the fabrication of a polyethylene article according to the invention. A polymer composition (Sample 3) was prepared by compounding 2000 ppm of sodium 4-chlorophenylamido-benzoate into a commercially-available, linear low density polyethylene polymer (Dowlex™ 2056G) having a density of approximately 0.922 g/cm³ and a melt flow index of approximately 1.0 dg/minute. The polyethylene resin used was first ground to about 35 mesh. The additive was added to the resin and blended in a Henschel high intensity mixer for about 2 minutes with a blade speed of about 2100 rpm. The sample was then melt compounded in a MPM single screw extruder, with a 38 mm diameter screw. The barrel temperature of the extruder was ramped from 160 to 190° C. The extrudate in the form of strands was cooled in a water bath and then subsequently pelletized.

The formed polymer composition pellet was then used to produce blown films (3 mil thickness) in a blown film line with a Future Design air ring using the following setup: 101.6 mm (4 in) die, 2.0 mm die gap, BUR 2.38, DDR 11, and output 23 kg/h. The Herman's orientation indices, recrystallization peak temperature, tear strength, dart drop impact, 1% secant modulus, and permeation, of the resulting films were measured and are reported in Tables 6, 7 and 8.

Another set of blown film was produced using the same high density polyethylene polymer without the nucleating agent (Comparative Sample 3).

TABLE 6

Herman's orientation indices of Sample 3 and Comparative Sample 3.

| Herman's orientation index | Sample 3 | Comparative Sample 3 |
|---|---|---|
| F(MD, 020) | 0.21 | −0.22 |
| F(TD, 020) | −0.12 | 0.06 |
| F(ND, 020) | −0.08 | 0.27 |

TABLE 7

Recrystallization peak temperature (Tc), teat strength, and dart drop impact of Sample 3 and Comparative Sample 3.

| Sample | Crystalline temperature (° C.) | TEAR MD Tear (g) | Std Dev | TD Tear (g) | Std Dev | Impact (g) |
|---|---|---|---|---|---|---|
| 3 | 111.3 | 1421 | 51 | 1341 | 290 | 757 |
| C. S. 3 | 104 | 1587 | 47 | 1771 | 76 | 725 |

TABLE 8

1% secant modulus and normalized transmission rate data of Sample 3 and Comparative Sample 3.

| Sample | 1% secant Modulus MD (MPa) | Std Dev | TD (MPa) | Std Dev | Normalized Transmission Rate (g · mil/m² · day) |
|---|---|---|---|---|---|
| 3 | 224 | 15 | 172 | 3 | 10.5 |
| C. S. 3 | 174 | 4 | 183 | 3 | 18.5 |

From the tables, the article of the invention (film made with Sample 3) exhibited preferential alignment of the b-axes of the polyethylene crystals in the machine direction of the article. The comparative article (film made with Comparative Sample 3) exhibited preferential alignment of the b-axes in the transverse and normal directions of the article. The articles of the invention also exhibited improvements in several physical properties, such as balanced MD-TD tear profile, higher MD modulus, and less permeation rate.

EXAMPLE 4

This example demonstrates the fabrication of a polyethylene article according to the invention. A polymer composition (Sample 4) was prepared by compounding 1500 ppm of sodium 4-chlorophenylamido-benzoate into a commercially-available high density polyethylene polymer (Exxon-Mobil™ HDPE HD 6719) having a density of approximately 0.952 g/cm³ and a melt flow index of approximately 19 dg/minute.

The polyethylene resin used was first ground to about 35 mesh. The additive was mixed with the ground resin with a Sunbeam® Kitchen Assistant mixer for up to 3 minutes. Then the mixed powder was extruded into a film with a Randcastle® microtruder equipped with a cast film die. The extrusion temperatures profile was set to 140, 190, 205 and 215° C. for different zones. The extrusion speed was about 100 rpm and the chill roll temperature was about 80° C.

The pole-figure analysis on film Sample 4 was performed using the same method as Sample 2. Due to the limitation of the sample size, no physical tests were performed on this sample.

Table 9 shows the Herman's orientation indices of the b-axis in the machine direction (MD), transverse direction (TD), and the normal direction (ND) for the film made from Sample 4. The article of the invention (film made with Sample 4) exhibited preferential alignment of the b-axes of the polyethylene crystals in the machine direction of the article

TABLE 9

Herman's orientation indices of Sample 4.

| Herman's orientation index | Sample 4 |
|---|---|
| F(MD, 020) | 0.24 |
| F(TD, 020) | 0.03 |
| F(ND, 020) | −0.28 |

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A polyethylene article produced from a molten polyethylene polymer, the article having a thickness, the article having at least one local machine direction ($MD_{local}$) corresponding to a direction in which the molten polyethylene polymer flowed within a region in the article when the article was produced, the article having a corresponding local transverse direction ($TD_{local}$) perpendicular to each local machine direction within the article, the article having a local normal direction ($ND_{local}$) perpendicular to each local machine direction and corresponding local transverse direction and parallel to a line passing through the thickness of the article, the polyethylene polymer comprising a plurality of lamellae, each lamella comprising crystalline polyethylene, the crystalline polyethylene having a b-axis, the b-axes of the crystalline polyethylene in the lamellae having a Herman's orientation index at each local machine direction ($F(MD_{local},020)$), a Herman's orientation index at each corresponding local transverse direction ($F(TD_{local},020)$), and a Herman's orientation index at each corresponding local normal direction ($F(ND_{local},020)$), the b-axes of the crystalline polyethylene in the lamella being oriented within the article such that $F(MD_{local},020)>0$, $F(MD_{local},020)>F(TD_{local},020)$, and $F(MD_{local},020)>F(ND_{local},020)$.

2. The polyethylene article of claim 1, wherein $F(MD_{local},020)>0.01$, $F(MD_{local},020)-F(TD_{local},020)>0.01$, $F(MD_{local},020)-F(ND_{local},020)>0.01$.

3. The polyethylene article of claim 1, wherein $F(MD_{local},020)>0.05$, $F(MD_{local},020)-F(TD_{local},020)>0.05$, $F(MD_{local},020)-F(ND_{local},020)>0.05$.

4. The polyethylene article of claim 1, wherein the article further comprises a nucleating agent for the polyethylene polymer.

5. The polyethylene article of claim 4, wherein the nucleating agent comprises a compound conforming to the structure of Formula (I)

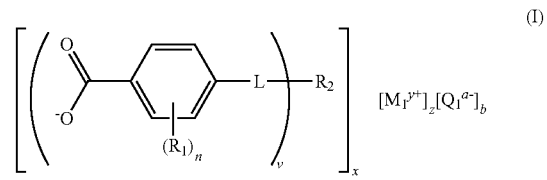

wherein $R_1$ is selected from the group consisting of hydroxy, halogens, alkyl groups, substituted alkyl groups, alkoxy groups, substituted alkoxy groups, aryl groups, and substituted aryl groups; n is zero or a positive integer from 1 to 4; L is a linking group comprising two or more atoms and at least one double bond between two atoms in the linking group; v is a positive integer from 1 to 3; $R_2$ is: (i) selected from the group consisting of alkyl groups, substituted alkyl groups, cycloalkyl groups, substituted cycloalkyl groups, aryl groups, substituted aryl groups, heteroaryl groups, and substituted heteroaryl groups when L is a divalent linking group and v is 1, (ii) selected from the group consisting of alkanediyl groups, substituted alkanediyl groups, cycloalkanediyl groups, substituted cycloalkanediyl groups, arenediyl groups, substituted arenediyl groups, heteroarenediyl groups, and substituted heteroarenediyl groups when L is a trivalent linking group and v is 1, (iii) selected from the group consisting of alkanediyl groups, substituted alkanediyl groups, cycloalkanediyl groups, substituted cycloalkanediyl groups, arenediyl groups, substituted arenediyl groups, heteroarenediyl groups, and substituted heteroarenediyl groups when L is a divalent linking group and v is 2, and (iv) selected from the group consisting of alkanetriyl groups, substituted alkanetriyl groups, cycloalkanetriyl groups, substituted cycloalkanetriyl groups, arenetriyl groups, substituted arenetriyl groups, heteroarenetriyl groups, and substituted heteroarenetriyl groups when L is a divalent linking group and v is 3; x is a positive integer; each $M_1$ is a metal cation; y is the valence of the cation; z is a positive integer; b is zero or a positive integer; when b is a positive integer, each $Q_1$ is a negatively-charged counterion and a is the valence of the negatively-charged counterion; and the values of v, x, y, z, a, and b satisfy the equation (vx)+(ab)=yz; wherein, when L is a divalent linking group, v is 1, and $R_2$ is a cycloalkyl group or a substituted cycloalkyl group, the cyclic portion of the cycloalkyl group or substituted cycloalkyl group comprises no more than two ring structures fused together.

6. The polyethylene article of claim 5, wherein the nucleating agent comprises a compound conforming to the structure of Formula (CX)

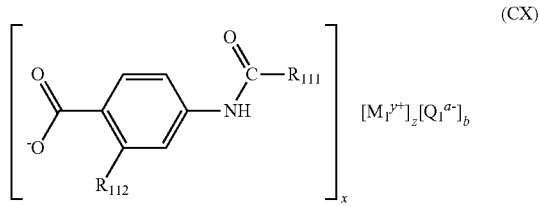

wherein $R_{111}$ is selected from the group consisting of a cyclopentyl group and moieties conforming to the structure of Formula (CXI); $R_{112}$ is selected from the group consisting of hydrogen and hydroxy; Formula (CXI) is

$R_{115}$ is selected from the group consisting of hydrogen, a halogen, methoxy, and phenyl; x is a positive integer; each $M_1$ is a metal cation; y is the valence of the cation; z is a positive integer; b is zero or a positive integer; when b is a positive integer, each $Q_1$ is a negatively-charged counterion and a is the valence of the negatively-charged counterion; and the values of x, y, z, a, and b satisfy the equation x+(ab)=yz.

7. The polyethylene article of claim 6, wherein $R_{111}$ is a moiety conforming to the structure of Formula (CXI).

8. The polyethylene article of claim 7, wherein $R_{115}$ is a halogen.

9. The polyethylene article of claim 8, wherein $R_{115}$ is chlorine.

10. The polyethylene article of claim 9, wherein $R_{112}$ is hydrogen.

11. The polyethylene article of claim 10, wherein x is 1, $M_1$ is a sodium cation, y is 1, z is 1, and b is zero.

12. The polyethylene article of claim 4, wherein the nucleating agent is present in the article in an amount of about 100 to about 5,000 parts-per-million (ppm), based on the total weight of the polyethylene polymer.

13. The polyethylene article of claim 12, wherein the nucleating agent is present in the article in an amount of about 250 to about 3,000 parts-per-million (ppm), based on the total weight of the polyethylene polymer.

14. The polyethylene article of claim 4, wherein the nucleating agent is present in the form of a plurality of particles, the particles having a length and a width, and the ratio of the length to the width is about 2:1 or greater.

15. The polyethylene article of claim 1, wherein the polyethylene polymer is a linear low density polyethylene.

16. The polyethylene article of claim 1, wherein the polyethylene polymer is a high density polyethylene.

17. A polyethylene article produced by extruding a molten polyethylene polymer through an orifice in a direction, the article having a thickness, the article having a machine direction (MD) corresponding to the direction in which the molten polyethylene polymer exited the orifice, the article having a transverse direction (TD) perpendicular to the machine direction and perpendicular to a line passing through the thickness of the article, the article having a normal direction (ND) perpendicular to the machine direction and the transverse direction and parallel to a line passing through the thickness of the article, the polyethylene polymer comprising a plurality of lamellae, each lamella comprising crystalline polyethylene, the crystalline polyethylene having a b-axis, the b-axes of the crystalline polyethylene in the lamellae having a Herman's orientation index in the machine direction (F(MD,020)), a Herman's orientation index in the transverse direction (F(TD,020)), and a Herman's orientation index in the normal direction (F(ND,020)), the b-axes of the crystalline polyethylene in the lamella being oriented within the article such that F(MD,020)>0, F(MD,020)>F(TD,020), and F(MD,020)>F(ND,020).

18. The polyethylene article of claim 17, wherein F(MD,020)>0.01, F(MD,020)−F(TD,020)>0.01, F(MD,020)−F(ND,020)>0.01.

19. The polyethylene article of claim 18, wherein F(MD,020)>0.05, F(MD,020)−F(TD,020)>0.05, F(MD,020)−F(ND,020)>0.05.

20. The polyethylene article of claim 17, wherein the article further comprises a nucleating agent for the polyethylene polymer.

21. The polyethylene article of claim 20, wherein the nucleating agent comprises a compound conforming to the structure of Formula (I)

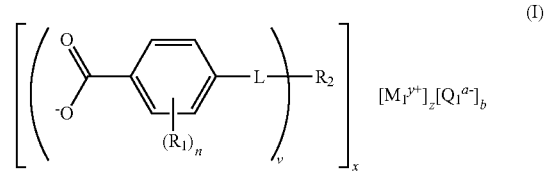

wherein $R_1$ is selected from the group consisting of hydroxy, halogens, alkyl groups, substituted alkyl groups, alkoxy groups, substituted alkoxy groups, aryl groups, and substituted aryl groups; n is zero or a positive integer from 1 to 4; L is a linking group comprising two or more atoms and at least one double bond between two atoms in the linking group; v is a positive integer from 1 to 3; $R_2$ is: (i) selected from the group consisting of alkyl groups, substituted alkyl groups, cycloalkyl groups, substituted cycloalkyl groups, aryl groups, substituted aryl groups, heteroaryl groups, and substituted heteroaryl groups when L is a divalent linking group and v is 1, (ii) selected from the group consisting of alkanediyl groups, substituted alkanediyl groups, cycloalkanediyl groups, substituted cycloalkanediyl groups, arenediyl groups, substituted arenediyl groups, heteroarenediyl groups, and substituted heteroarenediyl groups when L is a trivalent linking group and v is 1, (iii) selected from the group consisting of alkanediyl groups, substituted alkanediyl groups, cycloalkanediyl groups, substituted cycloalkanediyl groups, arenediyl groups, substituted arenediyl groups, heteroarenediyl groups, and substituted heteroarenediyl groups when L is a divalent linking group and v is 2, and (iv) selected from the group consisting of alkanetriyl groups, substituted alkanetriyl groups, cycloalkanetriyl groups, substituted cycloalkanetriyl groups, arenetriyl groups, substituted arenetriyl groups, heteroarenetriyl groups, and substituted heteroarenetriyl groups when L is a divalent linking group and v is 3; x is a positive integer; each $M_1$ is a metal cation; y is the valence of the cation; z is a positive integer; b is zero or a positive integer; when b is a positive integer, each $Q_1$ is a negatively-charged counterion and a is the valence of the negatively-charged counterion; and the values of v, x, y, z, a, and b satisfy the equation $(vx)+(ab)=yz$; wherein, when L is a divalent linking group, v is 1, and $R_2$ is a cycloalkyl group or a substituted cycloalkyl group, the cyclic portion of the cycloalkyl group or substituted cycloalkyl group comprises no more than two ring structures fused together.

22. The polyethylene article of claim 21, wherein the nucleating agent comprises a compound conforming to the structure of Formula (CX)

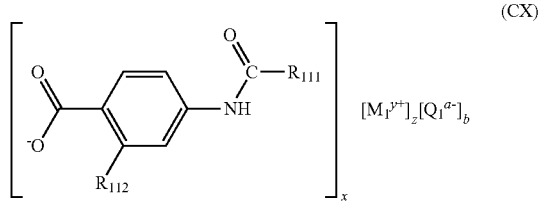

(CX)

wherein $R_{111}$ is selected from the group consisting of a cyclopentyl group and moieties conforming to the structure of Formula (CXI); $R_{112}$ is selected from the group consisting of hydrogen and hydroxy; Formula (CXI) is

(CXI)

$R_{115}$ is selected from the group consisting of hydrogen, a halogen, methoxy, and phenyl; x is a positive integer; each $M_1$ is a metal cation; y is the valence of the cation; z is a positive integer; b is zero or a positive integer; when b is a positive integer, each $Q_1$ is a negatively-charged counterion and a is the valence of the negatively-charged counterion; and the values of x, y, z, a, and b satisfy the equation $x+(ab)=yz$.

23. The polyethylene article of claim 22, wherein $R_{111}$ is a moiety conforming to the structure of Formula (CXI).

24. The polyethylene article of claim 23, wherein $R_{115}$ is a halogen.

25. The polyethylene article of claim 24, wherein $R_{115}$ is chlorine.

26. The polyethylene article of claim 25, wherein $R_{112}$ is hydrogen.

27. The polyethylene article of claim 26, wherein x is 1, $M_1$ is a sodium cation, y is 1, z is 1, and b is zero.

28. The polyethylene article of claim 20, wherein the nucleating agent is present in the article in an amount of about 100 to about 5,000 parts-per-million (ppm), based on the total weight of the polyethylene polymer.

29. The polyethylene article of claim 28, wherein the nucleating agent is present in the article in an amount of about 250 to about 3,000 parts-per-million (ppm), based on the total weight of the polyethylene polymer.

30. The polyethylene article of claim 20, wherein the nucleating agent is present in the form of a plurality of particles, the particles having a length and a width, and the ratio of the length to the width is about 2:1 or greater.

31. The polyethylene article of claim 17, wherein the polyethylene polymer is a linear low density polyethylene.

32. The polyethylene article of claim 17, wherein the polyethylene polymer is a high density polyethylene.

33. The polyethylene article of claim 17, wherein the article is a film.

34. The polyethylene article of claim 17, wherein the article is an extruded pipe.

* * * * *